United States Patent
Shaik et al.

(10) Patent No.: US 10,235,695 B2
(45) Date of Patent: *Mar. 19, 2019

(54) OUT OF HOME MEDIA MEASUREMENT

(71) Applicant: Cellco Partnership, Arlington, VA (US)

(72) Inventors: Altaff M. Shaik, Piscataway, NJ (US); Narendra Polavarapu, Ashburn, VA (US); Dustin L. Applegate, Shaker Heights, OH (US); Richard Stemper, Montvale, NJ (US); Satish K. Hosanagara, Flanders, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/202,360

(22) Filed: Jul. 5, 2016

(65) Prior Publication Data

US 2016/0314499 A1 Oct. 27, 2016

Related U.S. Application Data

(63) Continuation of application No. 14/030,443, filed on Sep. 18, 2013, now Pat. No. 9,418,126.

(51) Int. Cl.
*G06F 3/048* (2013.01)
*G06Q 30/02* (2012.01)
(Continued)

(52) U.S. Cl.
CPC ... *G06Q 30/0269* (2013.01); *G06F 17/30563* (2013.01); *G06Q 30/0201* (2013.01);
(Continued)

(58) Field of Classification Search
CPC ....................................................... G06F 3/048
See application file for complete search history.

(56) References Cited

U.S. PATENT DOCUMENTS

| 8,151,194 B1* | 4/2012 | Chan ................. G06F 17/30817 |
| | | 709/224 |
| 2007/0118643 A1* | 5/2007 | Mishra ................. H04L 41/082 |
| | | 709/224 |

(Continued)

*Primary Examiner* — Pei Yong Weng

(57) ABSTRACT

A system may include at least one data source configured to provide network usage data indicative of the existence of communications with subscriber devices, and web and application usage data indicative of data usage of the subscriber network by the subscriber devices. The system may also include a data warehouse server configured to perform operations including correlating the network usage data and web and application usage data into subscriber-level data; associating, with the subscriber-level data, subscriber attributes indicative of a preference of the subscriber for content in a particular category of content, and profile attributes indicative of demographic characteristics of the subscriber; matching the subscriber-level data with a set of subscriber profiles, each of the set of subscriber profiles including a set of subscriber attributes and profile attributes associated with the respective subscriber profile; and aggregating the subscriber-level data into aggregate-level data according to the matching subscriber profiles.

20 Claims, 16 Drawing Sheets

(51) Int. Cl.
*G06F 17/30* (2006.01)
*H04L 29/08* (2006.01)

(52) U.S. Cl.
CPC ......... *G06Q 30/0241* (2013.01); *H04L 67/22* (2013.01); *H04L 67/306* (2013.01)

(56) References Cited

U.S. PATENT DOCUMENTS

| | | | |
|---|---|---|---|
| 2010/0063877 A1* | 3/2010 | Soroca | G06F 17/30749 705/14.45 |
| 2010/0121744 A1* | 5/2010 | Belz | H04M 15/00 705/30 |

* cited by examiner

OUT OF HOME MEDIA MEASUREMENT

CROSS REFERENCE TO RELATED APPLICATIONS

This application is a continuation of, and claims priority from, U.S. patent application Ser. No. 14/030,443, filed on Sep. 18, 2013, the contents of which are hereby incorporated by reference in its entirety.

BACKGROUND

Marketers employ various data sources to help them to understand a market and target potential customers. For instance, marketers may review demographic information about an area when deciding whether to post a billboard or street furniture advertisement in that area. As another possibility, based on inferred information about individuals according to tracking of their purchase histories, a marketer may provide target coupons to specific purchasers. Or, a website may track Internet protocol addresses or user agent information to obtain information about the types of devices frequenting the website, and may use the information to tailor the advertising content of the site. However, these sources of information are difficult to compile, expensive to purchase and slow to update. Moreover, while such sources of information may relate back to the same or similar groups of people, current systems lack an ability to correlate locations, web usage, and other demographic aspects of potential purchasers to better inform marketing campaigns.

DETAILED DESCRIPTION

Figure 1A:
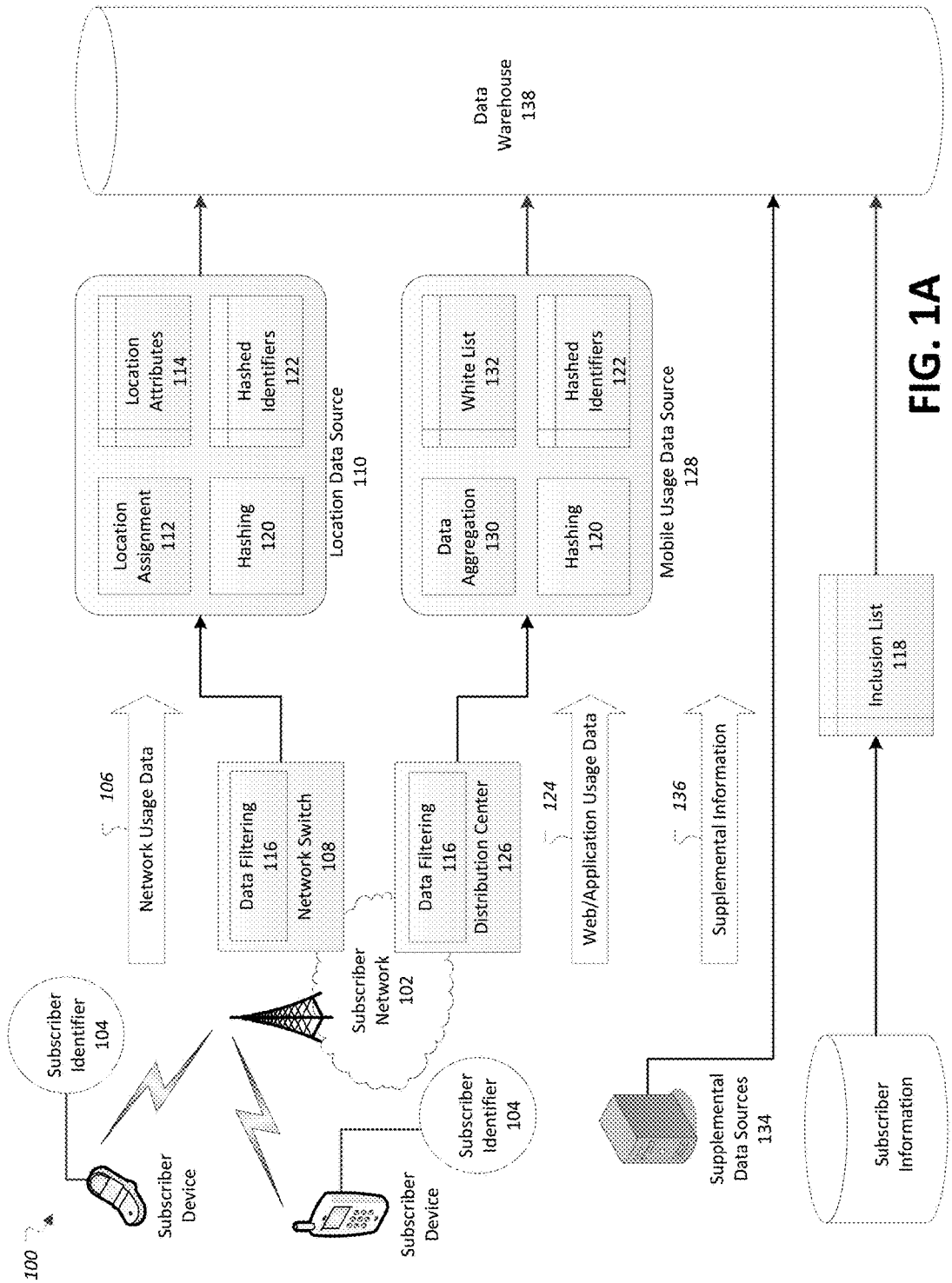
FIGS. 1A and 1B illustrate an exemplary network analysis system for providing reports based on collected data from subscriber network devices.

Many types of information are available to network service providers, such as subscriber billing information, mobile web and application usage, and location information related to where subscriber usage is being performed. For example, network service providers may collect data when mobile subscribers browse or use mobile applications on their mobile devices, the data including what sites were visited, what applications were used, lengths of time spend performing the usage, and where the mobile device was located during the usage. By combining these sources of information with demographic and behavioral information regarding the subscribers (e.g., from marketing information vendors such as Experian™ or Acxiom™), a system may determine aggregate intelligence about subscriber behavior and characteristics over the subscriber network. The aggregated data about the subscribers may be extrapolated from the group of subscribers to the population at large, and used to provide reports allowing marketers and other viewers to gain insight into their current or prospective customers.

Exemplary attributes that may be used to aggregate or group subscribers may include demographic attributes (e.g., gender, age, race, language), psychographic attributes (e.g., a preference for sports, health & beauty, home & garden), device attributes (e.g., device type, device operating system), and segmentation (e.g., predicted behavioral and lifestyle parameters according to compiled demographic surveys). The aggregate-level data may include collections of data on subscribers matched to subscriber profiles according to profile, location and time period. To increase accuracy of the compiled data, the determined audience profiles may be based on extrapolations from the aggregate number of network service provider subscribers who visit the site using their mobile devices (and who have not opted out of the system), normalized according to the demographics of the population at large.

Due to the sensitive nature of the information being gathered, the system may be configured to take certain precautions to ensure that customer information used to prepare the reports is disclosed to the third parties in aggregate or anonymous fashion, protecting the privacy of the network subscribers. This may be accomplished through various techniques, such as requiring users to opt-in to the system before their data may be used, anonymizing subscriber-identifiable data in the usage records (e.g., phone numbers) that may be exposed to marketers or third parties wishing to view the data, preventing reports from including information about subscribers if the query results include fewer than a predetermined number of results (e.g., one hundred subscribers), adjusting displayed report data for counts under a threshold value to prevent tracking of individuals, and providing reports including only aggregated information, not information about the individual subscribers.

As a simple reporting example, a report may provide analytics to a mobile retail site or physical location advertisement site describing the audience profile of visitors of that website over a certain time span, such as over weekends or during a time when the mobile site ran a promotion. As another reporting example, a mobile audience analyzer report may be used to provide metrics that illustrate the demographic breakdown of a site's audience, allowing a publisher to understand who is visiting the site generally. Advertising agencies may also use these metrics to determine whether a particular site is reaching the audience their client is targeting. As yet another example, an audience comparative analytics report may be used to compare the performance and mobile reach of different sites to determine which sites better reach a desired target audience. Such a report may be useful to advertising agencies advising clients on mobile advertising spending. As a further example, a mobile campaign performance report may compare traffic before and after a campaign to allow a site owner or advertising agency to identify whether an advertising campaign succeeded in driving additional traffic to a mobile site. Or, a mobile media planner report may display the top mobile sites or categories visited by desired audiences (e.g., the top 20 sites), for use in determining most popular sites or categories of sites visited by their selected targets. In addition to the reports listed above, the aggregated data compiled by the system may be available for the creation of other customer reports that may present the collected data in different manners or for different purposes.

Figure 1B:
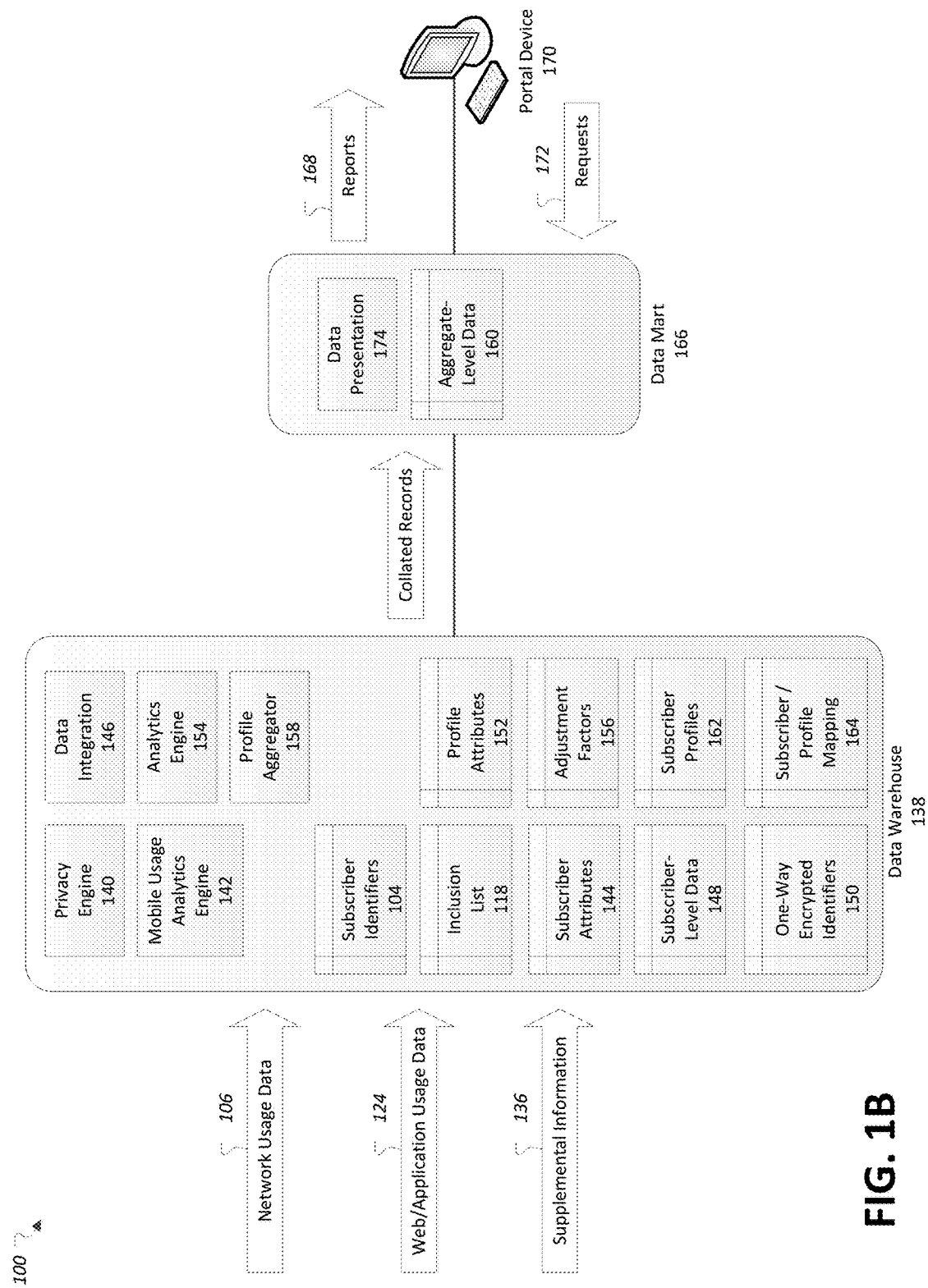

FIGS. 1A and 1B illustrate an exemplary network analysis system 100 for providing reports 168 based on collected data from subscriber network 102 devices. The system 100 may include a subscriber network 102 configured to provide communications services to a plurality of subscriber devices, and to generate network usage data 106 and web and application usage data 124 based on the provided services. The system may also include supplemental data sources 134 configured to provide supplemental information 136. The system may further include a data warehouse 138 configured to receive and process network usage data 106 received from a location data source 110, web and application usage data 124 received from a mobile usage data source 128 and supplemental information 136 received from one or more supplemental data sources 134. The data warehouse 138 may be configured to assign subscriber attributes 144 and profile attributes 152 to the received data, and process the received data into aggregate-level data 160 by matching the assigned attributes to a set of subscriber profiles 162. A data mart 166 may be configured to receive the aggregate-level data 160 from the data warehouse 138 and to provide reports 168 to the portal devices 170 based on the aggregate-level data 160 responsive to report requests 172. The system 100 may take many different forms and includes multiple and/or alternate components and facilities. For example, although one example of modularization of the location data source 110, mobile usage data source 128, data warehouse 138 and data mart 166 is described, it should be understood that the operations thereof may be provided by fewer, greater, or differently named modules. While an exemplary system 100 is shown in FIG. 1, the exemplary components illustrated of the system 100 are not intended to be limiting. Indeed, additional or alternative components and/or implementations may be used.

The subscriber network 102 may provide communications services, such as packet-switched network services (e.g., Internet access, VoIP communication services) and location services (e.g., device positioning), to devices connected to the subscriber network 102. Exemplary subscriber networks 102 may include a VoIP network, a VoLTE (Voice over LTE) network, a cellular telephone network, a fiber optic network, and a cable television network, as some non-limiting examples.

Subscriber devices on the subscriber network 102 may be associated with subscriber identifiers 104 used to unique identify the corresponding devices. Subscriber identifiers 104 may include various types of information sufficient to identify the identity of a subscriber or a subscriber device over the subscriber network 102, such as mobile device numbers (MDNs), mobile identification numbers (MINs), telephone numbers, common language location identifier (CLLI) codes, Internet protocol (IP) addresses, and universal resource identifiers (URIs), as some non-limiting examples.

The subscriber network 102 may generate data records representing usage the subscriber network 102 by the subscriber devices, for purposes including billing and traffic management. Exemplary usage of the subscriber network 102 may include making a call, sending or receiving a text message, using the web browser to access Internet web pages, and interacting with a networked application in communication with a remote data store. A usage data record of a subscriber making use of the subscriber network 102 may be referred to herein as a transaction or transaction record. Usage records of transactions may include information indexed according to the subscriber identifier 104 of the device using the subscriber network 102. For example, data records of phone calls and SMS messages sent or received by a subscriber device may include the MDN of the originating device and of the destination devices.

The subscriber network 102 may be configured to capture network usage data 106 from various network elements. Network usage data 106 may include data captured when a subscriber is involved in a voice call over the network 102, sends or receives a text message over the network 102, or otherwise makes use of a data or voice service of the network to communicate with other subscriber devices accessible via the subscriber network 102. The network elements of the subscriber network 102 may include a collection of network switches 108 or other devices throughout the network 102 configured to track and record these subscriber transactions, e.g., regarding usage of the subscriber network 102 services by subscriber communications devices for billing purposes. This data collected by the network switches 108 or other devices may include, for example, bandwidth usage, usage duration, usage begin time, usage end time, line usage directionality, endpoint name and location, and quality of service, as some examples. The network usage data 106 may use the collected data to identify and include information regarding when the communications took place, as well as identifiers of the network switches 108 or other devices throughout the network 102 from which location information may be determined. (It should be noted that approximate times may be sufficient for inclusion in the network usage data 106 (e.g., rounded to the nearest second or five seconds), rather than the full precision of time information that may be captured by the network.) Accordingly, the network usage data 106 may include records of subscriber actions typically recorded in the ordinary course of business.

One exemplary method for determining location information to include in network usage data 106 may be to use advanced forward link trilateration (AFLT), whereby a time difference of arrival technique is employed based on responses to signals received from multiple nearby base stations. The distances from the base stations may be estimated from round trip delay in the responses, thereby narrowing down the location information without requiring subscriber devices to be capable of global positioning systems (GPS). If available, GPS may additionally or alternately be used to provide or augment location fixes for network usage data 106. Another method for determining location information to include in network usage data 106 is by way of identification of a communication being served by an antenna system configured to operate in a confined and specific area, such as a section of a stadium or other venue. For example, identifying that a subscriber device is being served by one of the antenna systems may allow for determination of location data regarding the subscriber position within the venue with relatively high accuracy and precision.

The network switches 108 may also be configured to utilize a data filtering module 116 to filter out records of network usage data 106 for users that have not opted into (or that have opted out of) use of the system 100 or whose data should otherwise be excluded from use. This may be done at the subscriber network 102 source, to allow the system 100 to gather data only for subscribers who should not be filtered out. To do so, the data filtering module 116 may utilize an inclusion list 118 including information regarding which subscribers should be included or excluded from use of the system 100. As one possibility, the inclusion list 118 may include a listing of subscriber identifiers 104 for subscribers who have opted into use of the system 100. The inclusion list 118 may accordingly be used to allow the data filtering module 116 to filter out the data records for subscribers who had not provided their consent to have their data included in the system 100. The inclusion list 118 may also be used to filter out other categories of subscribers whose privacy should be protected, such as business account holders (e.g., identified by accounts with an indicator that it is receiving a corporate discount, or accounts with more than a predetermined number of lines, as one possibility fifteen), federal/state/local government accounts, or pre-paid accounts, as some additional possibilities. As yet a further example, the inclusion list 118 may include a listing of locations (e.g., geo-fence data) for which data should not be collected or should be discarded, if collected.

The location data source 110 may be a network equipment center configured to provide functionality for collection and processing of network usage data 106. The location data source 110 may be configured to receive network usage data 106 from the various network switches 108 of the subscriber network 102. The location data source 110 may further utilize a location assignment module 112 to identify and associate additional location information with the captured network usage data 106 to indicate the locations of the subscriber devices when the records of network usage data 106 were captured. For example, the location assignment module 112 may be configured to associate the received network usage data 106 with corresponding location attributes 114, such as latitude and longitude coordinates, roadway segments, geo-fence information related to the location of the underlying call or network 102 use, or associations of the transaction record with a point of interest, such as a store or other landmark at or nearby the indicated location.

In some examples, instead of or in addition to the filtering performed by the network switches 108, the location data source 110 may also be configured to utilize a data filtering module 116 (not shown) to filter out records of network usage data 106 for users that have not opted into (or that have opted out of) use of the system 100 or whose data should otherwise be excluded from use.

To preserve anonymity, the location data source 110 may be configured to utilize a hashing module 120 to convert subscriber identifiers 104 included in the network usage data 106 (e.g., customer mobile numbers, origination MIN, dialed digits) into hashed identifiers 122 using a network service provider-defined two-way encryption methodology. A two-way encryption methodology may be utilized to allow for the decryption of the data by recipients of the data from the location data source 110 having the knowledge and information required to perform the decryption.

The subscriber network 102 may also be configured to capture web and application usage data 124 from various network elements. These network elements may include a collection of regional distribution centers 126 or other devices throughout the network 102 containing equipment used to complete wireless mobile data requests to data services, such as websites or data repositories feeding data to device applications. The distribution centers 126 may be configured to track subscriber transactions and record web and application usage data 124 regarding Internet usage of subscriber network 102 services by subscriber communications devices, e.g., as part of tracking subscriber usage to facilitate billing. In some cases, the distribution centers 126 may be configured to perform more detailed data gathering than required for billing purposes, such as deep packet inspection to obtain details of hypertext transfer protocol (HTTP) header information or other information being requested or provided to the subscriber devices of the network 102. Thus, the distribution centers 126 may be configured to capture web and application usage data 124 related to mobile internet usage by network service provider subscribers including data such as: end time of receiving information from a uniform resource locator (URL) address, duration of time spent at the URL, a hashed identifier 122 of the subscriber MDN, an indication of the HTTP method used (e.g., GET, POST), the URL being accessed, user agent strings (e.g., including device operating system, browser type and browser version), an indication of content type (e.g., text/html), a response code resulting from the HTTP method, a number bytes sent or received, an indication of a type of sub-network over which the usage was made (e.g., 3G, 4G), indications of usage of mobile applications, lengths of time spend performing browsing and application use, number of application downloads, and network topology location where the URL was accessed or the application was used or downloaded.

Similar to as done with the network switches 108, the network switches 108 may be configured to utilize a data filtering module 116 to filter out records of web and application usage data 124 for users that have not opted into use of the system 100 (e.g., according to the inclusion list 118) or whose data should otherwise be excluded from use (e.g., remove content from subscribers identified as being at restricted locations).

The mobile usage data source 128 may be a network equipment center configured to provide functionality for collection of network usage data 106 from the distribution centers 126. The mobile usage data source 128 may be configured to collect the web and application usage data 124 from the various distribution centers 126 and provide the collected web and application usage data 124 web to the data warehouse 138. In some examples, the mobile usage data source 128 may also be configured to utilize a data filtering module 116 to filter out records of web and application usage data 124 for users that have not opted into use of the system 100. Similar to as done with the location data source 110, to preserve anonymity subscriber identifiers 104 included in the web and application usage data 124 may be converted by a hashing module 120 into hashed identifiers 122 using a network service provider defined two-way encryption methodology.

The mobile usage data source 128 may further utilize a data aggregation module 130 to perform certain preprocessing on the web and application usage data 124. For example, the data aggregation module 130 may be configured to accumulate web and application usage data 124 for a subscriber (e.g., keyed to subscriber identifier 104 or hashed identifier 122) over a period of time (e.g., per day) to aggregate certain types of data. As an example of when aggregation may be performed, if a subscriber navigates to a URL, many follow-on requests may follow to that initial URL request to fill in the details of the requested webpage. For example, the main page may include embedded images or pages that require additional "get" requests for small images or other elements of content that make up the requested page. The data aggregation module 130 may be configured to recognize those multiple requests to the same domain in logged records and aggregate them into a single usage record. As an example of when aggregation should not be performed, the system 100 may prefer not to aggregate the requests in order to capture certain included domains in the images or other elements of content that make up the requested page (e.g., embedded advertisements requested from advertising domains or other information that may be used to identify subscriber preferences). So that selected domains may avoid being aggregated, the data aggregation module 130 may utilize a listing of domains that the data aggregation module 130 should not aggregate. This listing may be referred to as a white list 132. The white list 132 may be communicated to the mobile usage data source 128 using a similar process to that used to receive the inclusion list 118, although the white list 132 may change less frequently than the inclusion list 118.

The system 100 may further include various additional supplemental data sources 134 configured to provide supplemental information 136 to the system 100 apart from subscriber usage of the network 102. As one example, a supplemental data source 134 may be configured to provide supplemental information 136 indicative of demographics regarding residents (e.g., census information, third-party compiled information from a vendor such as Experian™ or Acxion™), in many cases broken down geographically (e.g., by state or zip code). As other examples, the supplemental data sources 134 may be configured to provide supplemental information 136 regarding subscribers based on their attributes (e.g., age, gender, race, income, primary language), as well as supplemental information 136 including road segment traffic count information or stadium (or other venue) attendance information for use in analysis of drivers or venue attendees. As yet a further example, a supplemental data source 134 may include billing information regarding customer accounts of the subscriber network 102 that may include address, age, gender, or other account holder information relevant to the system 100.

The data warehouse 138 may be configured to receive and maintain data received from the location data source 110, mobile usage data source 128 and supplemental data sources 134. For example, the data warehouse 138 may be configured to receive network usage data 106 processed by and received from the location data sources 110, web and application usage data 124 processed by and received from the mobile usage data sources 128, and supplemental information 136 received from the supplemental data sources 134. As explained in detail below with respect to FIG. 1B, the data warehouse 138 may be configured to decrypt hashed identifiers 122 in the received network usage data 106 and web and application usage data 124 into subscriber identifiers 104, correlate the received data by decrypted subscriber identifier 104 (e.g., MDNs of the subscriber devices), and perform additional data enrichment, aggregation, and processing on the resultant correlated records.

To support the data filtering modules 116 of the location data sources 110 and mobile usage data sources 128, the data warehouse 138 may be further configured to include a privacy engine 140 configured to update and maintain the inclusion list 118. The privacy engine 140 may receive a feed including up-to-date privacy information, which may be provided to the data sources 110 and 128 daily, monthly, or as updated, as some examples. The privacy engine 140 may be configured to provide the updated inclusion list 118 to the data sources 110 and 128 to allow the data sources 110 and 128 to selectively remove data that should not be analyzed by the system 100. The privacy engine 140 may similarly be used to provide updated versions of the white list 132 to the mobile usage data source 128.

The data warehouse 138 may further include a mobile usage analytics engine 142 configured to process and extract relevant information from the received web and application usage data 124. For example, the mobile usage analytics engine 142 may be configured to enrich the records of web and application usage data 124 to include additional information, such as the URLs of websites that were visited before and after a given URL or application was used. As another example, the mobile usage analytics engine 142 may be configured to perform further aggregation and filtering of the web and application usage data 124 to remove information from sites that is not useful for the system 100, such as data regarding websites including inappropriate (e.g., violent or graphic images) or obscene content (e.g., pornography), content that is deemed too sensitive such as banking or financial information, or content for which information is not currently being requested by clients running reports.

For the remaining web and application usage data 124, the mobile usage analytics engine 142 may be configured to assign categories to the URLs and applications used (e.g., "news", "sports", "real estate", "social", "travel", "business", "automotive", etc.). For example, a visit to the CNN website may be assigned to a "news" category, while a visit to the ESPN website may be assigned to a "sports" category. Moreover, for each category, the mobile usage analytics engine 142 may be configured to produce a listing of the top destinations in each category from the web and application usage data 124. For instance, the top destinations in each category may be determined as those that constitute a certain threshold amount of the overall web and application usage data 124 (e.g., the websites that amount to 90% of the usage, as one possibility). The listing of top destinations may further include the total visits and total unique visits for each entry, and may be ordered according to decreasing amount of usage, such that the first identified top destination is the destination receiving the most traffic or hits. Sites that are outside of the listing of top destinations, as well as visited by subscribers that are filtered out from the analysis by the mobile usage analytics engine 142, may be associated with an "other" category.

The mobile usage analytics engine 142 may be further configured to assign subscriber attributes 144 to the web and application usage data 124 records based on the category analysis. A subscriber attribute 144 may be indicative of a preference of the subscriber for content in a particular category of content. A subscriber may be associated with zero or more subscriber attributes 144. For example, the mobile usage analytics engine 142 may analyze the processed web and application usage data 124 for a subscriber (e.g., keyed to a subscriber identifier 104 or hashed identifier 122) over a period of time (e.g., per day) to derive subscriber attributes 144 for that subscriber's records over the time period. For instance, a subscriber who has browsed several websites within the "sports" category during the day might be associated with a "sports enthusiast" subscriber attribute 144. As another example, a subscriber who frequents travel websites may be associated with a "business travel" subscriber attribute 144. As yet a further example, a subscriber who frequents discount websites may be associated with a "discount shopper" subscriber attribute 144. The mobile usage analytics engine 142 may utilize various heuristics to determine how much subscriber activity may be required to associate a subscriber with a category. For example, mobile usage analytics engine 142 may utilize a minimum threshold number of visits to websites in a category (e.g., three visits in a day) to associate the subscriber with that category, or a minimum threshold percent of visits to websites in the category (e.g., 15% of a subscriber's requests) to associate the subscriber with that category. In some cases, the mobile usage analytics engine 142 may require subscriber activity for a category in a plurality of periods of time (e.g., over multiple days) in order to associate a subscriber with a category. Moreover, the mobile usage analytics engine 142 may update subscriber attributes 144 associated with the subscribers based on data received for later periods of time.

The mobile usage analytics engine 142 may also be configured to perform additional data extraction and enrichment on the web and application usage data 124. For example, the mobile usage analytics engine 142 may be configured to parse information in the web and application usage data 124 to create a separate data field for device operating system (e.g., Android, Apple iOS, webOS, Windows, etc.), and based on the information may determine statistics regarding the percent usage of various device operating systems over the subscriber network 102. As another example, the mobile usage analytics engine 142 may be configured to create a separate data field for web browser version and type. As yet a further example, the mobile usage analytics engine 142 may be configured to determine additional aggregated information in records relating to the subscribers, such as the total number of page views that the subscriber browsed.

The data warehouse 138 may also include a data integration module 146 configured to combine the separate information network usage data 106, web and application usage data 124 and supplemental information 136 together around specific subscribers. For example, the data integration module 146 may be configured to correlate the network usage data 106 and web and application usage data 124 together based on individual subscriber identifiers 104 (e.g., device MDN), thereby providing combined information related to subscriber location attributes 114 as well as related to subscriber attributes 144. This combined subscriber information may be referred to as subscriber-level data 148, and may be maintained by the data warehouse 138.

The data integration module 146 may be further configured to apply the inclusion list 118 against the data 106, 124 and 136 to ensure that no records belonging to excluded subscribers are included in the subscriber-level data 148. The application of the inclusion list 118 may be performed after the correlation of the subscriber-level data 148 as a further safety measure, in case changes to the inclusion list 118 may not have been propagated to the location data source 110 or the mobile usage data source 128.

The data integration module 146 may be further configured to re-encrypt the subscriber identifiers 104 into one-way encrypted identifiers 150 for the subscriber-level data 148. The re-encryption may be performed after the creation of the subscriber-level data 148 and after the application of the inclusion list 118. The re-encryption may be performed by the data integration module 146 using a one-way mechanism providing one-way encrypted identifiers 150 relatively impervious to decryption due to its one-way nature (e.g., for use outside the data warehouse 138 by the data mart 166 and portal devices 170 as discussed below). For example, the re-encryption may perform a hashing using a cryptographic hashing function or procedure designed to obfuscate or otherwise encrypt input data using to mathematical operations. The hashing may be configured to receive the subscriber identifiers 104 and a salt value (e.g., random data used as an additional input to the hashing algorithm), and provide an encrypted fixed-size bit string digest from which the subscriber identifier 104 may not be readily determined. The hashing may further include performing a truncation of the digest value to produce a one-way encrypted identifier 150 that does not contain the entire encrypted value, thereby making it extremely difficult for a one-way encrypted identifier 150 to be reversed back into the original subscriber identifier 104. The data warehouse 138 may also maintain a correlation between one-way encrypted identifiers 150 and subscriber identifier 104 within the data warehouse 138 to facilitate later mapping back of the one-way encrypted identifiers 150 with the corresponding subscriber identifier 104, should such an operation be necessary.

The data integration module 146 may further utilize supplemental information 136 to associate additional information with the subscribers in the subscriber-level data 148. For instance, based on received subscriber account and demographic supplemental information 136, the data integration module 146 may be configured to identify profile attributes 152 to associate with subscribers in the subscriber-level data 148. The profile attributes 152 may identify various profile characteristics of the subscribers, such as age range (e.g., 12-24, 25-34, 35-44, 45-54, 55, 64, 65-74, 75+, in some cases computed according to birthdate information in the subscribed account information), income level (e.g., <$40,000, $40,000-$49,999, $50,000-$74,999, $75,000-$99,999, $100,000-$124,999, $125,000+), gender (male or female), education level (e.g., high school, college, graduate school), race/ethnicity (e.g., White, Asian, other), primary language for communication (e.g., English, Spanish), zip code of residence, and whether the subscriber owns or rents a home (e.g., based on customer surveys or whether address information indicates an apartment). As one example, profile attributes 152 for a subscriber derived from the subscriber account supplemental information 136 may indicate that the subscriber is Male, College-educated, a renter, Asian, between the ages of 18-25, and prefers English for communication. These profile attributes 152 may be included in the subscriber-level data 148 in association with usage data of the subscriber.

The data integration module 146 may be further configured to perform additional transforms to generate the subscriber-level data 148. As one example, the data integration module 146 may be configured to associate the subscriber-level data 148 records with day-parts (e.g., rounded to 1-hour periods) based on timestamp information included in the network usage data 106 and web and application usage data 124 being combined. The rounding of day information into day-parts may be performed for various reasons, such as to facilitate the aggregation of usage represented by the subscriber-level data 148 over day-parts, to reduce the storage requirements for time information in the subscriber-level data 148, and to help protect subscriber privacy by reducing the amount of timing information that is retained about the data usage of the subscribers. As another example, the data integration module 146 may be configured to assign points of interest to records of subscriber-level data 148, based on identification of close points of interest to the location information of the transaction specified by the usage records.

The data warehouse 138 may also include an analytics engine 154 configured to determine adjustment factors 156 to apply to the subscriber-level data 148 to weigh and extrapolate the subscriber-level data 148 to be representative of the population at large. For example, a larger weight may cause actions by the weighted subscriber to be counted more heavily in data analysis than subscribers associated with lower weights. By applying the adjustment factors 156 to the subscriber-level data 148 to adjust the data to be in conformance with the population at large, the analytics engine 154 may increase the accuracy and predictive value of the subscriber-level data 148.

As one adjustment, to represent the network service provider population in size and to represent the U.S. population in distribution, the analytics engine 154 may be configured to assign a subscriber weight adjustment factors 156 to subscribers. This subscriber weight adjustment factor 156 may be required because the composition of the pool of subscribers of the network service provider may not be identical to the U.S. population in general. The subscriber weight adjustment factor 156 may be applied to each individual in the subscriber-level data 148 based on whether the individual has over or under represented attributes. As one example, if the user base of the network service provider includes 50% college graduates, but the population at large includes only 30% college graduates, then the actions of non-college graduates may receive relatively higher weightings to avoid skewing the data sets too much toward college graduates. As another example, a network service provider subscriber population may be 53% male and 47% female, but the U.S. population is approximately 49% male and 51% female. Thus, the network service provider male subscribers may collectively be weighted as 48% of the overall population, with the female subscribers collectively weighted as approximately 52% of the overall population, to allow the data to be scaled correctly to the gender mix of the overall population.

As another adjustment, to represent the U.S. population in size and distribution, the analytics engine 154 may be configured to assign a national weight adjustment factor 156 to each individual. The national weight adjustment factors 156 may be assigned such that the total weight is equal to the total US population count, and that the average weight is equal to the subscriber weight multiplied by a scaling constant. For instance, if approximately half of the population represents subscribers, then the constant may be approximately two.

As yet another adjustment, the analytics engine 154 may be configured to determine usage adjustment factors 156 to adjust for relative usage levels of different subscribers, as some individuals use their phones more frequently than others. For example, subscriber "A" may use his phone three times as often as subscriber "B". Accordingly, when the subscriber "B" uses his phone, his usage may be weighted three times more heavily as those of subscriber "A". The relative levels of usage may be determined based on the activity for the subscribers "A" and "B" within the subscriber-level data 148 being generated, or in other cases further based on previous maintained periods of time of subscriber-level data 148. This behavior may also be normalized by the analytics engine 154 to determine usage adjustment factors 156 to give relatively higher weighting to subscriber actions (e.g., subscriber visit counts) of subscribers who use their phones less often generally.

As a further adjustment, the analytics engine 154 may be configured to determine non-usage adjustment factors 156 to account for individuals who were at a location (e.g., at a sporting event), but who were inactive on their devices. For example, ten subscribers may have attended a sporting event at a venue, but only seven of them may have made or received a text or a call or otherwise used his/her device. A location fix would therefore not be established for the remaining three subscribers as there would be no network usage data 106 captured for those devices. To account for such individuals, as one example a scaling factor may be applied to all data received from sporting event locations. The scaling factor may be determined, for example, as a constant value based on a historical average of what percentage of subscribers typically use their devices at the venue. As a specific example, a scaling factor of between approximately 1.2 and 1.6 may be utilized, to account for present but inactive subscribers.

As a somewhat different type of adjustment, a confidence adjustment factor 156 on determined points of interest for subscribers specified in the subscriber-level data 148 may further be determined by the analytics engine 154, based on the proximity of the transaction to the identified point of interest location. For example, a location for a data record may be identified as a Starbucks located at 123 Main St., with decreasing certainty based on a distance from the identified location of the subscriber device to the Starbucks geo-location. For example, if the subscriber transaction is determined to be at a location five meters away from a Starbucks geo-location, then the confidence adjustment factor 156 may be high, but if the subscriber transaction is determined to be at a location fifty meters away from the Starbucks geo-location, then the confidence adjustment factor 156 may be lower, reflecting the reduced possibility that the subscriber was actually at Starbucks. When considering the subscribers in the aggregate, the confidence adjustment factor 156 may be used to reduce the contribution of that subscriber as being associated with a location. For example, a subscriber determined to be at Starbucks with a low confidence adjustment factor 156 may only count as a fraction of a whole subscriber as being at that Starbucks location when determining percentages of subscriber who visit particular locations.

The data warehouse 138 may include a profile aggregator 158 configured to aggregate the subscriber-level data 148 into aggregate-level data 160 according to a set of subscriber profiles 162. A subscriber profile 162 may be defined as a combination of attributes values, such as the subscriber attributes 144 and profile attributes 152 discussed above. Profiles may further include a unique profile identifier with which the subscriber profile 162 may be associated. The data warehouse 138 may group subscriber usage information into subscriber profiles 162 to which their attributes match. This grouping of subscribers into subscriber profiles 162 may help reduce the overall number of records to be maintained and improve system 100 performance compared to allowing for querying of all subscriber-level data 148. The grouping of subscribers may also support target audience creation for potential advertising customers based on the inclusion of customer-requested subscriber profiles 162. Exemplary attributes to use to aggregate or group subscribers may include demographic attributes (e.g., gender, age, race, language), psychographic attributes (e.g., preference for sports, health & beauty, home & garden), device attributes (e.g., device type, device operating system), and segmentation (e.g., predicted behavioral and lifestyle parameters according to compiled demographic surveys).

The aggregate-level data 160 may include collections of subscriber transactions aggregated according to subscriber profile 162, location and time period. For example, one aspect of aggregate-level data 160 may include a sum of all transactions of subscribers matching a particular subscriber profile 162, during a particular day part, over a week or other period of time. To preserve subscriber privacy, no individual subscriber data apart from the aggregation may typically be included in the aggregate-level data 160.

As the subscriber profile 162 definitions may be relatively static over multiple periods of data aggregation of subscriber-level data 148, the profile aggregator 158 may be configured to utilize a subscriber to profile mapping 164 that associates subscribers (e.g., according to one-way encrypted identifier 150) with the identifiers of the subscriber profiles 162. The subscriber to profile mapping 164 may include further information, such as a location information (e.g., zip code) and adjustment factors 156 (e.g., subscriber weight, national weight) associated with the subscriber profile to facilitate the generation of aggregate-level data 160. Notably, data for a subscriber may match more than one subscriber profile 162 in the subscriber to profile mapping 164; thus, the aggregate-level data 160 may include collections of subscriber transactions according to subscriber profiles 162 having varying levels of specificity. To generate the aggregate-level data 160, the profile aggregator 158 may match the subscriber-level data 148 to subscriber profiles 162 using the profile mapping 164, and may use any adjustment factors 156 associated with the subscribers in the profile mapping 164 to weigh the subscriber transactions being aggregated to determine total extrapolated counts for individuals matching the subscriber profiles 162.

In some cases, elements of aggregate-level data 160 may include only one or a few subscribers. To avoid potential security concerns with having so few individuals that they may be identified, the profile aggregator 158 may be configured to prevent the publishing of aggregate-level data 160 for which the aggregation is of fewer records than for a predefined threshold of records, e.g., one hundred records. Any queries for data matching fewer than the predefined threshold of records would therefore return an error indicating that insufficient data is available.

The data warehouse 138 may be configured to provide the aggregate-level data 160 to the data mart 166 to facilitate the generation of reports 168 by the data mart 166 to be provided to portal devices 170. As the data mart 166 may store the aggregate-level data 160, but not have access to the subscriber-level data 148, privacy of the subscriber data may be safe from those having access to the report 168 generation or other aspects of the data storage of the data mart 166.

Reports 168 may be made available via a portal device 170, and may provide various types of information regarding subscribers that may useful for marketing purposes. To be provided a report 168, a user of the portal device 170 may cause the portal device 170 to send a report request 172 to the data mart 166. The data mart 166 may validate that the user is authorized to receive the requested report 168, and if so, may generate and provide the report 168 back to the portal device 170 responsive to the request 172. In some cases the reports 168 may be provided as static documents such as portable document format (PDF) files, while in other cases the reports 168 may be provided in an interactive format, such as web pages facilitating the dynamic selection and viewing of the aggregate-level data 160. For example, certain users of the portal device 170 may have access to reports 168 including data related to their own marketing campaigns, but not to data including campaigns of their competitors. As another example, other users such as advertising agencies may have access to substantially all underlying data for reports 172. As another possibility, customers may be restricted to access only certain locations (e.g., venues such as stadiums) or only certain events. For instance, the New York Jets may have access to data reported in Metlife stadium about Jets events at the stadium, but not to New York Giants events in the stadium. The Metlife stadium may, however, have access to both categories of events.

As one example, a simple report 168 may provide analytics to a mobile retail site describing the audience profile of visitors of that website over a certain time span, such as over weekends or during a time when the mobile site ran a promotion. Further exemplary reports 168 are discussed in detail below with respect to FIGS. 4A-4I.

The data mart 166 may utilize a data presentation module 174 to perform certain presentation operations on the aggregate-level data 160 to be queried to generate the requested reports 168. As one example, the data presentation module 174 may be configured to prevent the presentation of any data for which total extrapolated counts for individuals matching the subscriber profiles 162 are less than a predetermined threshold value (e.g., less than one hundred extrapolated individuals). In such a case, rather than providing the actual data in a graphed set of report 168 data, the data presentation module 174 may instead return a visualization indicating that the selected report criteria returned insufficient data to provide a report 168, and that the user should provide broader criteria to obtain a report 168. This minimum threshold may be beneficial to preserve the privacy of subscribers by preventing a user from selecting search criteria narrow enough to allow for the querying of data known to be generated by only one or a few individuals.

The data presentation module 174 may be further configured to perform upward rounding of small percentage numbers of hard values (e.g., extrapolated counts of subscriber data) to protect data privacy in the provided reports 168. For example, if a subscriber attribute 144 for a set of subscribers has a count of one hundred visits, out of a total count of 66,700 visits, the 100 visits may account for only 0.14999% of the total 66,700 visits. If percentage data of the visit counts is shown in a report 168 rounded to the tenth of a percent, the 0.14999% value may be rounded down to 0.1%. In such a case it may appear that the count is 66.7, when the true count is 100. To protect against this anomaly, the data presentation module 174 may validate that displayed percentage counts are above at least a minimum threshold. For example, for data values that are greater than zero but less than the threshold value (e.g., one hundred and fifty), the data presentation module 174 may inflate the data value to be the threshold value (e.g., one hundred and fifty). Thus, rather than showing the visit count as 0.1%, instead the visit count would be displayed as one hundred and fifty out of the 66,700 or 0.2%. To avoid the total percentage as being displayed as over 100% in the report 168, the report 168 may simply not include a total percent value.

As an alternate approach, the data presentation module 174 may be configured to perform downward rounding of small percentage numbers of hard values. For example, for data values that are less up to a threshold value (e.g., one hundred and fifty), those counts may be rounded to zero. The other counts that are greater than the threshold value may be slightly inflated to redistribute the remaining percentage across the attribute values that are greater than the threshold value. However, despite the redistribution of percentage across the remaining values, the total actual count value may continue to be displayed without the adjustments, as that value is more accurate than one computed based on the updated percentages and in any event does not expose privacy issues with small counts as the individual count values might.

Figure 2:
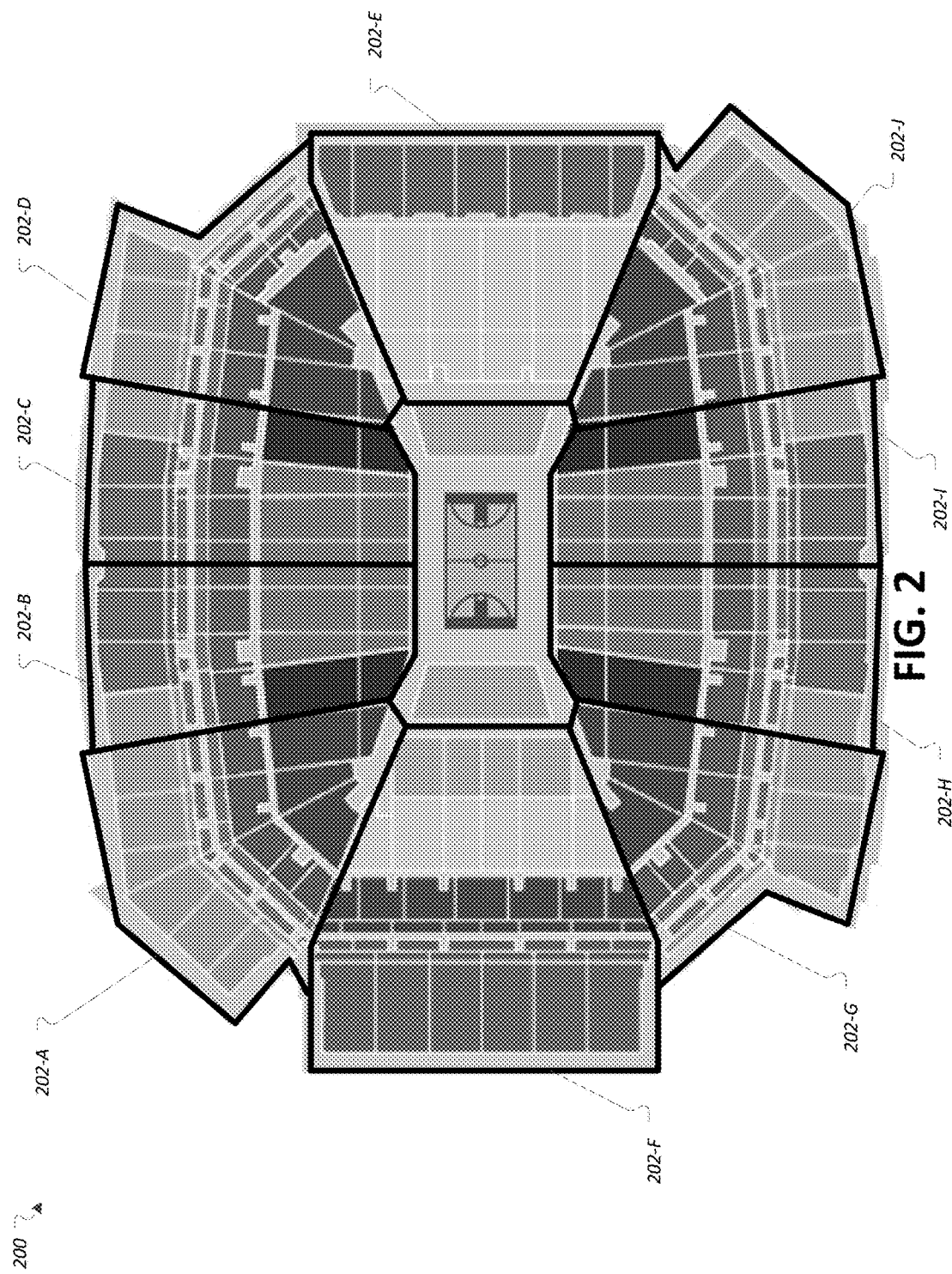
FIG. 2 illustrates an exemplary venue including a plurality of venue locations from which subscriber information is collected.

FIG. 2 illustrates an exemplary venue 200 including a plurality of venue locations 202-A through 202-J (collectively 202) from which subscriber information is collected. For example, each of the venue locations 202-A through 202-J may be served by one or more of a plurality of directed antenna systems. Accordingly, network usage data 106 for subscriber transactions performed when subscriber devices are connected to the directed antenna systems may be associated with the particular respective values location 202 within the venue 200, thereby allowing for determination of location attributes 114 indicative of subscriber location within the venue 200 with relatively high accuracy and precision.

Moreover, web and application usage data 124 collected from the subscribers (when at the venue 200 or elsewhere) may be analyzed to determine information regarding what the located subscribers were accessing on their subscriber devices. For instance, web and application usage data 124 from the subscribers may be analyzed by the data warehouse 138 to determine top mobile sites visited by subscribers in attendance at the venue 200.

Yet further, by combining the network usage data 106 and web and application usage data 124 with supplemental information 136 (such as subscriber billing information and demographic information), the data warehouse 138 may generate aggregate-level data 160 indicative of demographic breakdown of venue 200 attendees, such as how many or what percent of attendees of a particular venue 200 event were males between the ages of 35-44, or even what points of interest are most frequented by those male attendees of the particular venue 200 event. The venue 200, acts who perform at the venue 200, or advertisers of the venue 200 may accordingly use a portal device 170 to send requests 172 to the data mart 166 for reports 168 indicative of these and other aspects of the audience available in the venue 200. An advertiser reviewing the reports 168 may use the included information to become better informed about what campaigns to target audiences that attend the venue 200 events.

Figure 3:
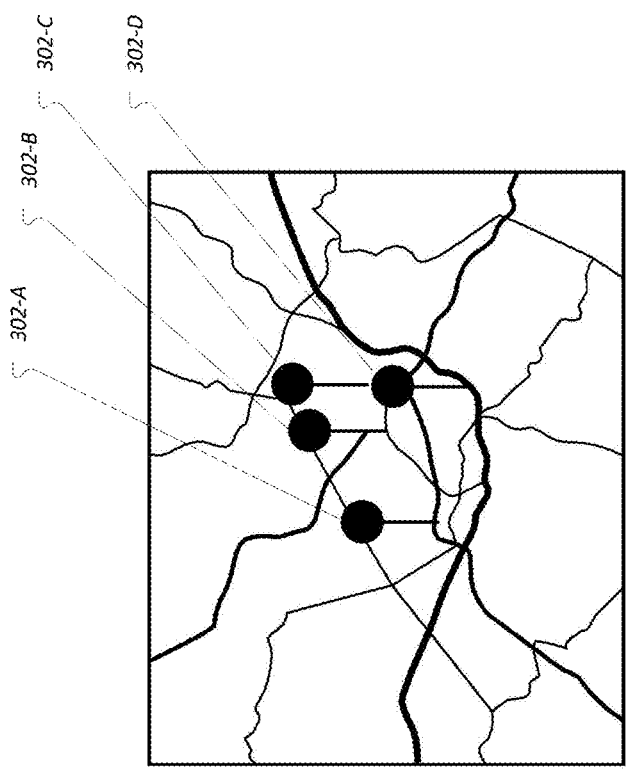
FIG. 3 illustrates an exemplary map including a plurality of advertisement locations at which advertisements are placed.

FIG. 3 illustrates an exemplary map 300 including a plurality of advertisement locations 302-A through 302-D (collectively 302) at which advertisements are placed. Each of the advertisement locations 302-A through 302-D (e.g., roadway billboards, street furniture) is displayed on the map at its location on the map 300 (e.g., along a roadway) served by a subscriber network 102. When subscriber devices perform network usage indicative of passing by the respective advertisement locations 302, network usage data 106 for the performed subscriber transactions may be associated with location attributes 114 indicative of the advertisement locations 302. Web and application usage data 124 also collected from the subscribers may be analyzed to determine information regarding what the located subscribers were accessing on their subscriber devices. By combining the network usage data 106 and web and application usage data 124 with supplemental information 136, the data warehouse 138 may generate aggregate-level data 160 that may be used to provide information about the audience of subscribers who pass by the advertisement locations 302. For example, a billboard owner or advertiser may use a portal device 170 to send requests 172 to the data mart 166 for reports 168 regarding the demographics, favorite websites, or other aspects of the subscribers who pass by the advertisement location 302 over various points of time (e.g., per day, on a particular day, on weekends, on Monday nights, etc.).

Figure 4A:
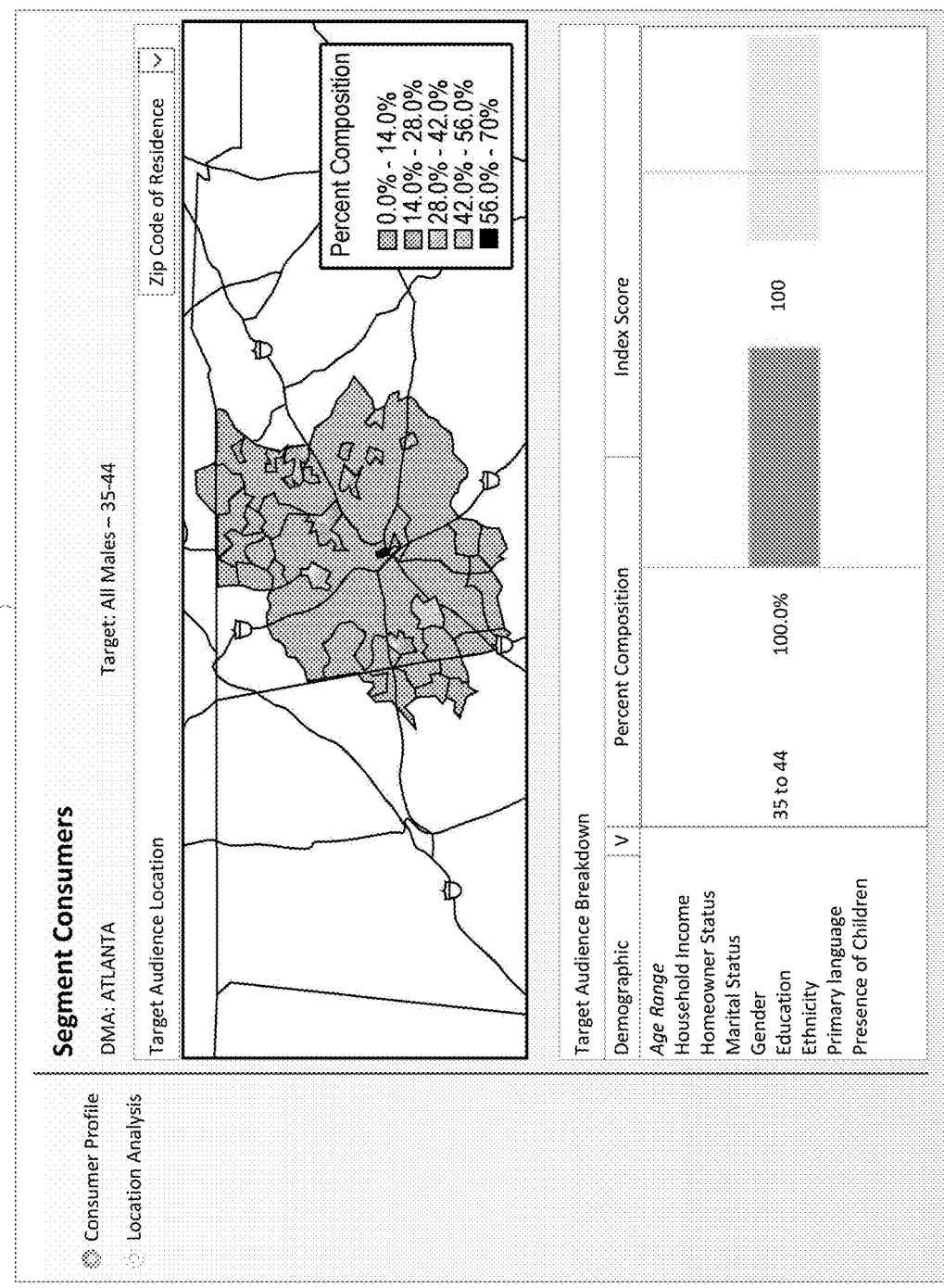
FIG. 4A illustrates an exemplary report of demographics of a subscriber segment.

FIG. 4A illustrates an exemplary report 168-A of demographics of a subscriber segment. The report 168-A may be generated, for example, based on a request 172 to the data mart 166 from a portal device 170 for information about subscribers having location attributes 114 in the Atlanta, Ga. region, and having profile attributes 152 of males within the age range of 35-44 years old. Based on the request 172, the report 168-A including aggregate-level data 160 for subscribers having a subscriber profile 162 with the requested location attributes 114 and profile attributes 152.

The report 168-A includes a color-coded visualization of the Atlanta, Ga. region, illustrating a graphical map of percentages of individuals in Atlanta zip codes who are male and 35-44. As shown, most of the zip codes include a relatively lower percentage of the group, but certain zip codes include a significantly higher percentage, which may be useful information for an advertiser marketing to that demographic to identify. The report 168-A further includes a target audience breakdown, which may include a visualization of various other demographic aspects of the retrieved matching aggregate-level data 160. For example, the age range includes 100% individuals from 35-44, as this was specified by the request 172. Moreover, the received aggregate-level data 160 may also be visualized according to other profile attributes 152, such as household income, homeowner status, marital status, gender, education level, ethnicity, primary language, and presence of children, as some examples.

Figure 4B:
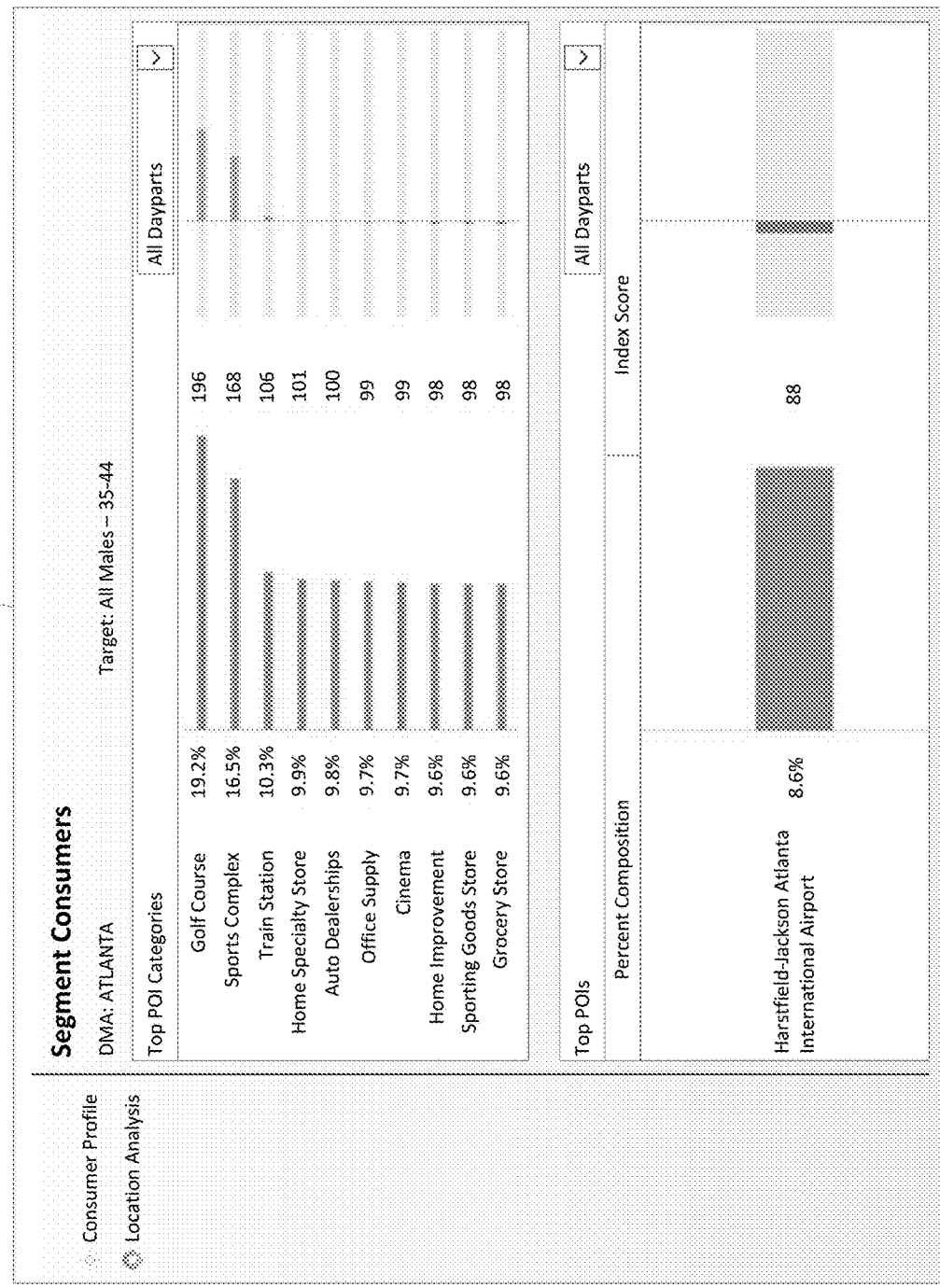
FIG. 4B illustrates an exemplary report of top point of interest categories of a subscriber segment.

FIG. 4B illustrates an exemplary report 168-B of top point of interest categories of a subscriber segment. The report 168-B may also be generated based on a request 172 to the data mart 166 from a portal device 170 for information about subscribers that pass by selected advertisement locations 302.

The report 168-B includes a visualization of top point of interest categories for the received aggregate-level data 160. These top point of interest categories may be determined by the data warehouse 138 based on one or both of web and application usage data 124 from the subscribers included in the aggregate-level data 160 and location attributes 114 associated with network usage data 106 from the subscribers included in the aggregate-level data 160. As illustrated, golf courses and sports complexes are relatively popular with the selected demographic and location. The report 168-B may also include a visualization of top points of interest. As illustrated the Hartsfield-Jackson Atlanta International Airport is one top point of interest of this demographic and location. It should be noted that other top points of interest may have also been present in the subscriber data, but may not have been included in the report because they were lower than a threshold amount of data required for visualization (e.g., to protect subscriber privacy as discussed above).

Figure 4C:
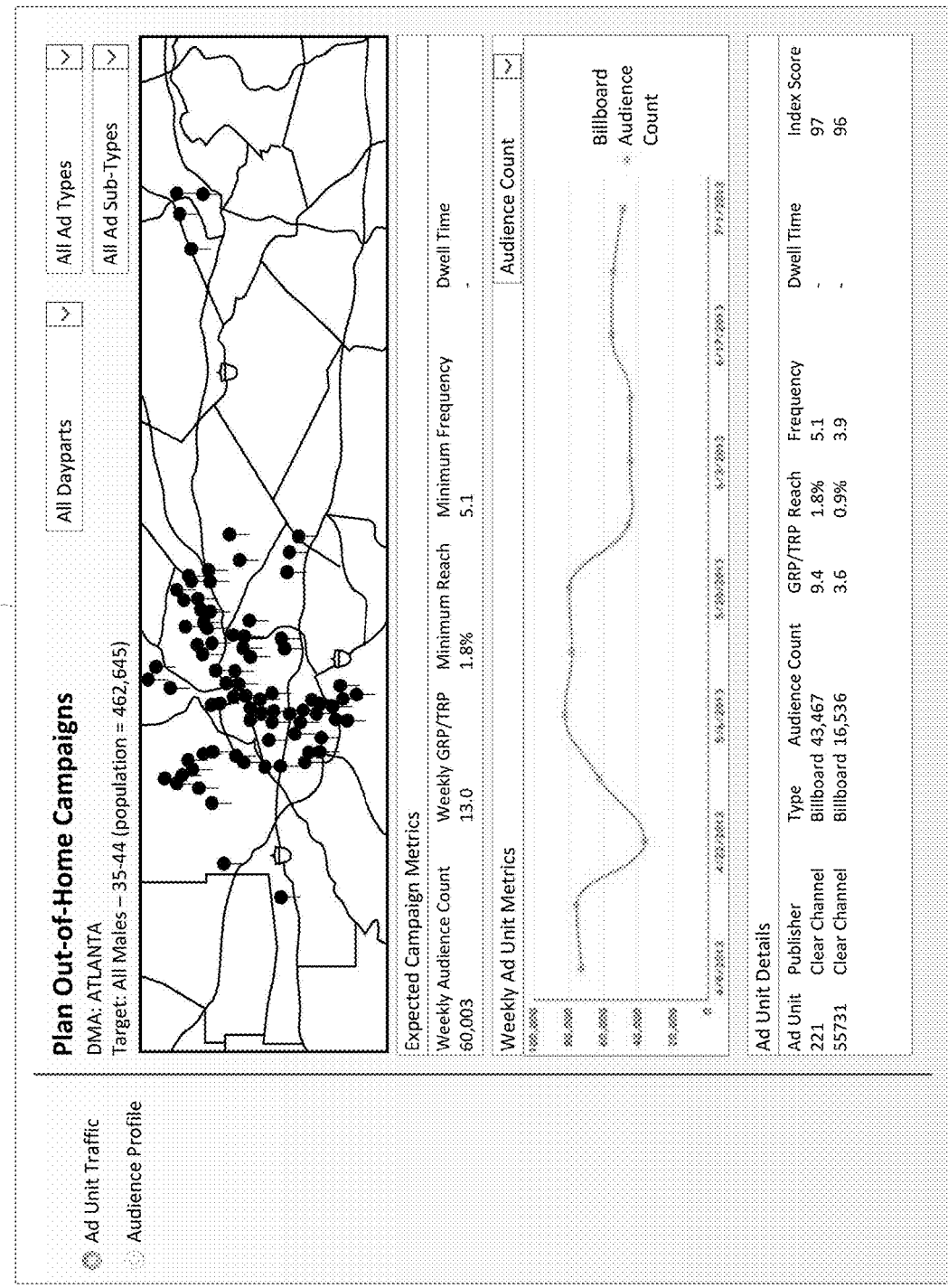
FIG. 4C illustrates an exemplary report of ad unit traffic information for selected out-of-home advertisement locations.

FIG. 4C illustrates an exemplary report 168-C of ad unit traffic information for selected out-of-home advertisement locations 302. The report 168-C may be generated based on a request 172 to the data mart 166 from a portal device 170 for information about advertisement location 302 in the Atlanta, Ga. region as viewed by subscribers having profile attributes 152 of males within the age range of 35-44 years old. The report 168-C may accordingly include a visualization of advertisement locations 302 on a graphical map of the region at their respective locations. The report 168-C may further allow for selection of the advertisement location 302 to facilitate viewing of additional information about the selected advertisement locations 302. For example, the report 168-C may include details about the specific selected advertisement locations 302 (e.g., ad units 221 and 55731), as well as a visualization of weekly audience counts for the selected advertisement locations 302 over time. The report 168-C may further include a breakdown of ad unit traffic information by one or more additional criteria. For example, the report 168-C may include a day-part pull down control to allow for the report 168-C to be filtered by a selected daypart (e.g., all dayparts, for morning rush hour, afternoon rush hour, 12-2 PM, etc.). As another example, the report 168-C may include ad type and ad subtype pull down controls to allow for the report 168-C to be filtered by a selected ad type (e.g., billboard, street furniture, etc.) and subtype (e.g., digital billboard, fixed billboard, etc.).

Figure 4D:
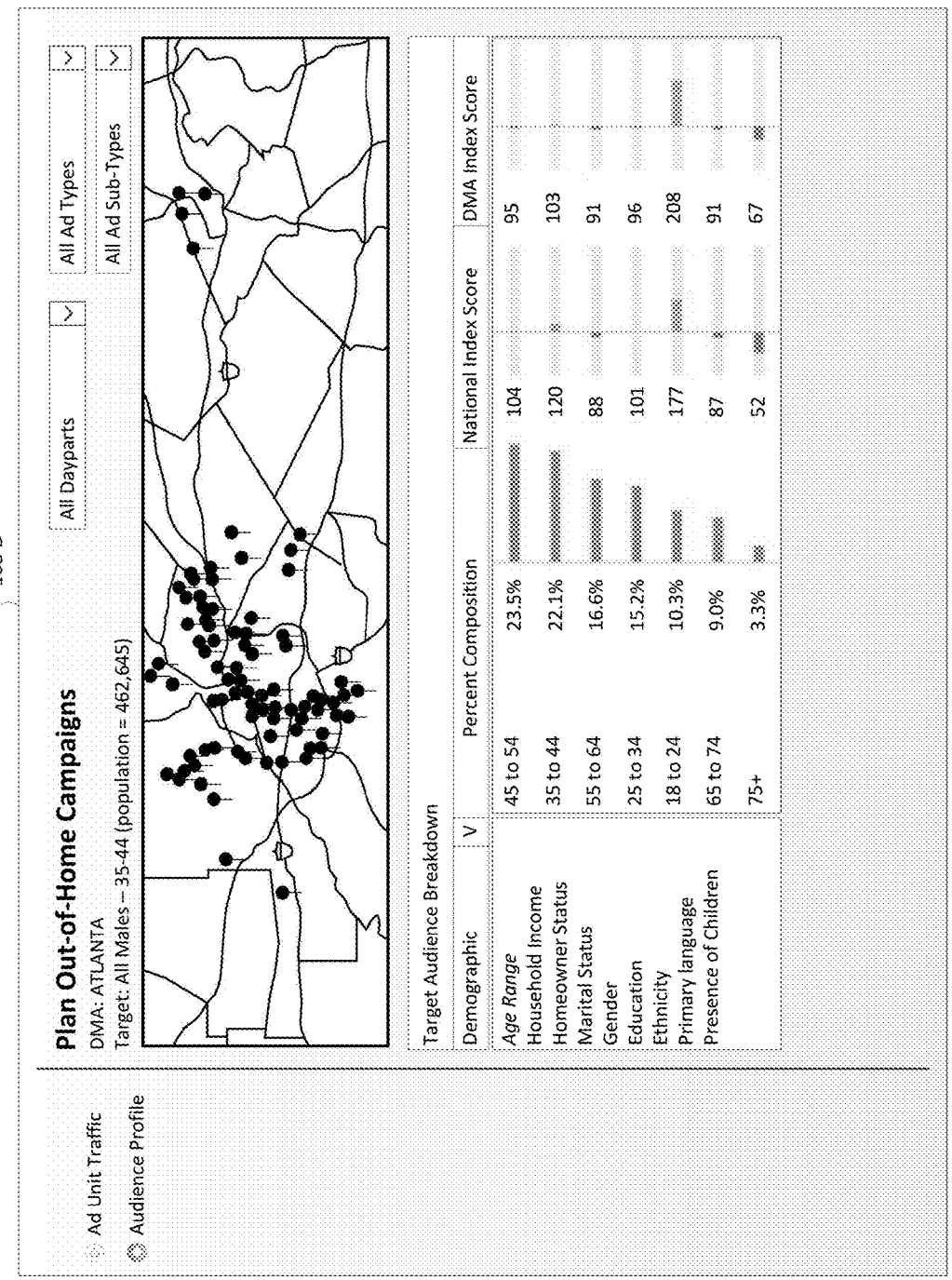
FIG. 4D illustrates an exemplary report of audience profile information for selected out-of-home advertisement locations.

FIG. 4D illustrates an exemplary report 168-D of audience profile information for selected out-of-home advertisement locations 302. As with the report 168-C, the report 168-D may be generated based on a request 172 for information about advertisement locations 302 in the Atlanta, Ga. region, as viewed by subscribers having profile attributes 152 of males within the age range of 35-44 years old. The report 168-D may facilitate the visualization of the received aggregate-level data 160 according to profile attributes 152, such as household income, homeowner status, marital status, gender, education level, ethnicity, primary language, and presence of children, as some examples. As shown, the report 168-D includes a breakdown of the aggregate-level data 160 according to age range. In addition to percent composition according to age range, the report 168-D may also include a comparison of the percent composition of the selected profile attributes 152 to that of a national average, as well as to a more local average, such as to a designated market region (e.g., as defined by the Nielson Company for use in analyzing television audiences) in which the selected ad units are located. While the exemplary report 168-D allows for selection of aggregate-level data 160 according to one profile attribute 152, other visualizations may further allow for selection of the aggregate-level data 160 according to multiple profile attributes 152, and the presentation of data according to the multiple selection.

Figure 4E:
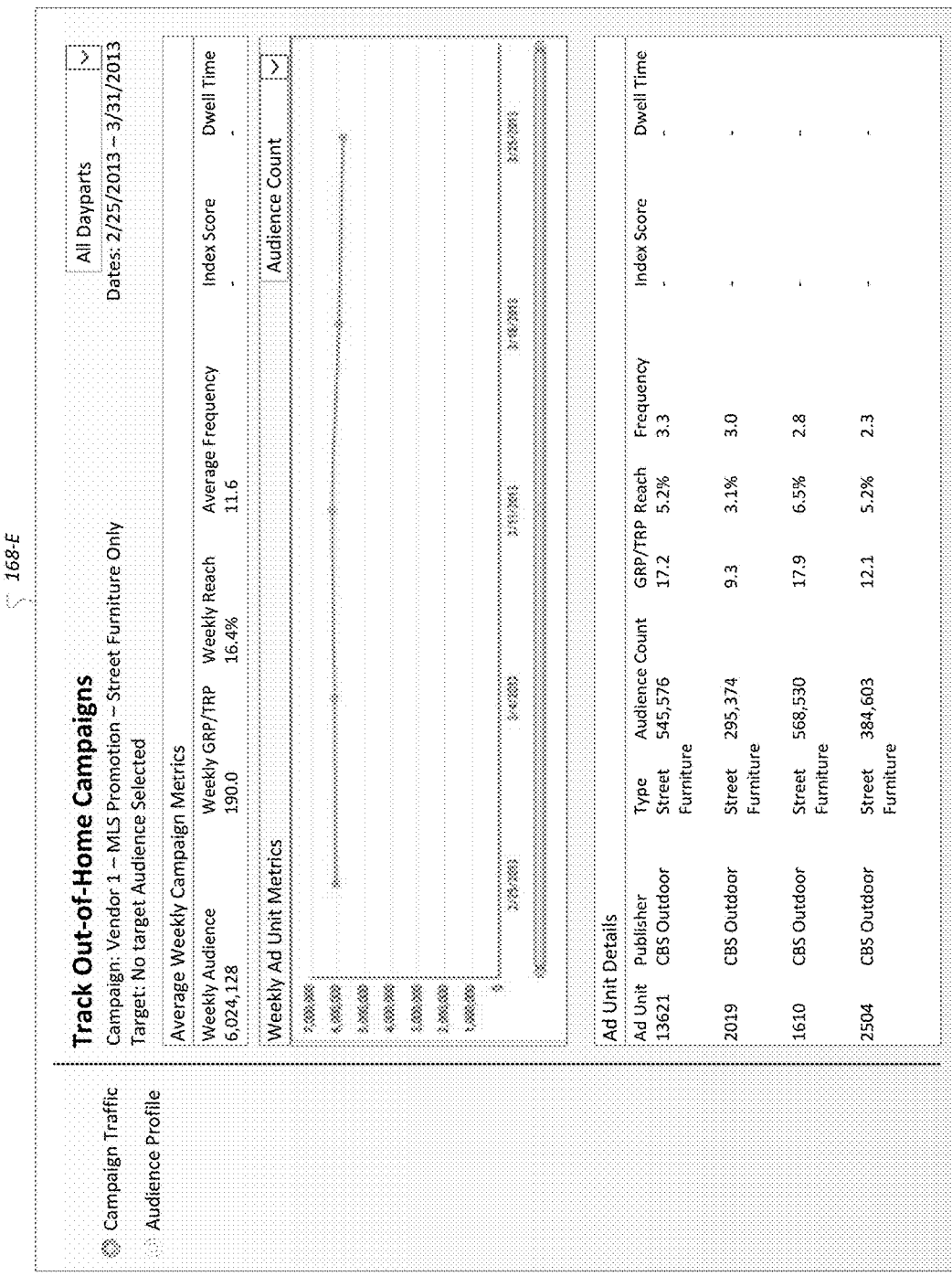
FIG. 4E illustrates an exemplary report of campaign traffic information for selected street furniture advertisement locations.

FIG. 4E illustrates an exemplary report 168-E of campaign traffic information for selected street furniture advertisement locations 302. The report 168-E may be generated based on a request 172 to the data mart 166 from a portal device 170 for information about street furniture advertisement location 302 as part of a campaign of a vendor (e.g., "Vendor 1" as illustrated) over a selected period of time (e.g., Feb. 2, 2013 through Mar. 31, 2013). The report 168-E may include information regarding the audience for the campaign, such as weekly audience counts, a graphical visualization of weekly audience count, weekly gross rating point (GRP)/target audience point (TRP), weekly reach or average frequency over time, and details of specific ad units within the campaign (e.g., counts and other details of selected street furniture advertisement locations 302). The GRP may refer to a measure of a size of an audience that may be reached by the specified ad units, while the TRP may refer to the GRPs delivered to a specific target audience. Reach may refer to reach a number of different people exposed, at least once, to the ad unit during a given time period. Frequency may refer to the number of times that an individual that is reached is exposed to the ad unit. The report 168-E may further include a breakdown of ad unit information by day-part, using a day part pull down to allow for the report 168-C to be filtered by a selected daypart.

Figure 4F:
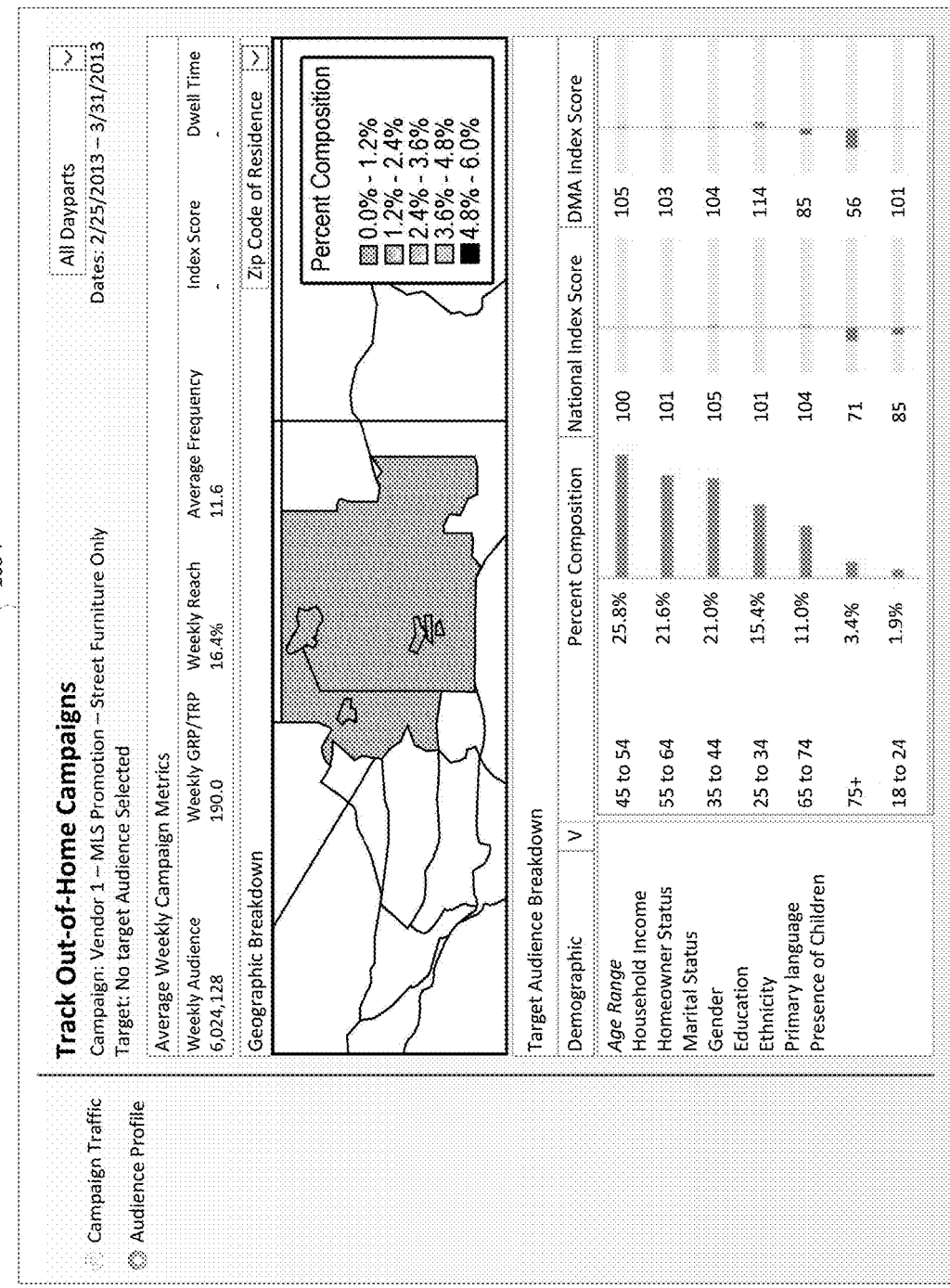
FIG. 4F illustrates an exemplary report of audience profile information for selected street furniture advertisement locations.

FIG. 4F illustrates an exemplary report 168-F of audience profile information for a selected street furniture advertisement location 302. As with the report 168-E, the report 168-F may be generated based on a request 172 to the data mart 166 from a portal device 170 for information about street furniture advertisement location 302 as part of a campaign of a vendor. The report 168-F includes information about the average weekly audience of the selected campaign, as well as a visualization of a graphical map of percentages of individuals in the campaign according to a specified geographic breakdown (e.g., map zip code, designated market region, etc.). The report 168-E further includes a visualization of the received aggregate-level data 160 according to selectable profile attributes 152, such as by age range as illustrated, including comparison to national and designated market region averages. The report 168-F may further include a breakdown of ad unit information by day-part, using a day part pull down to allow for the report 168-C to be filtered by a selected daypart.

Figure 4G:
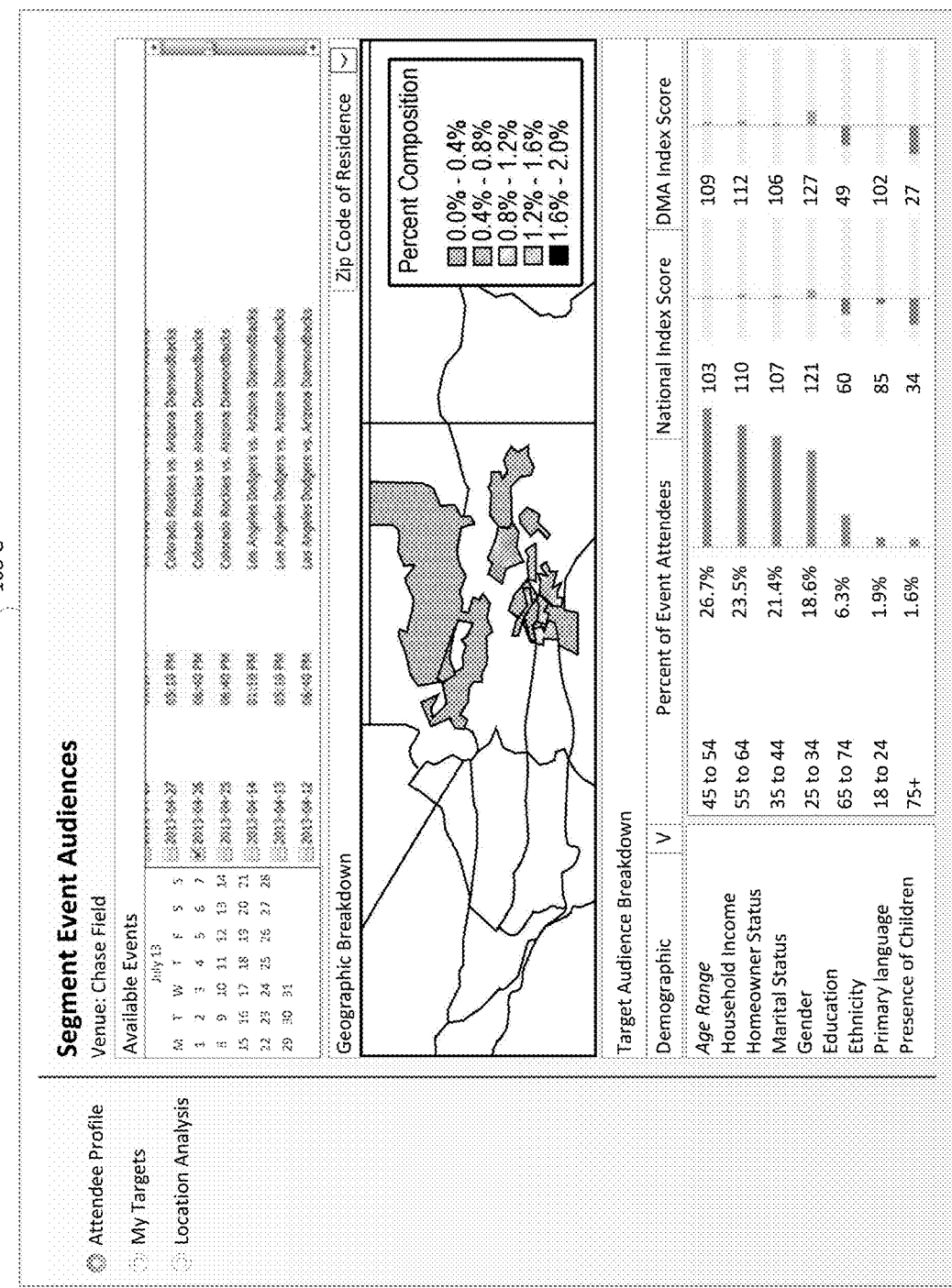
FIG. 4G illustrates an exemplary report of attendee profile information for a selected event at a venue.

FIG. 4G illustrates an exemplary report 168-G of attendee profile information for a selected event at a venue 200. For example, the report 168-G may include information about individuals in attendance at a Colorado Rockies vs. Arizona Diamondbacks sporting event on Apr. 26, 2013. The report 168-E includes a graphical geographic visualization of attendees of the event according to percentages of individuals in attendance according to a specified geographic breakdown (e.g., by residence zip code, by residence designated market region, etc.). The report 168-E further includes a visualization of the attendees by profile attribute 152, similar to as discussed above for other reports 168.

Figure 4H:
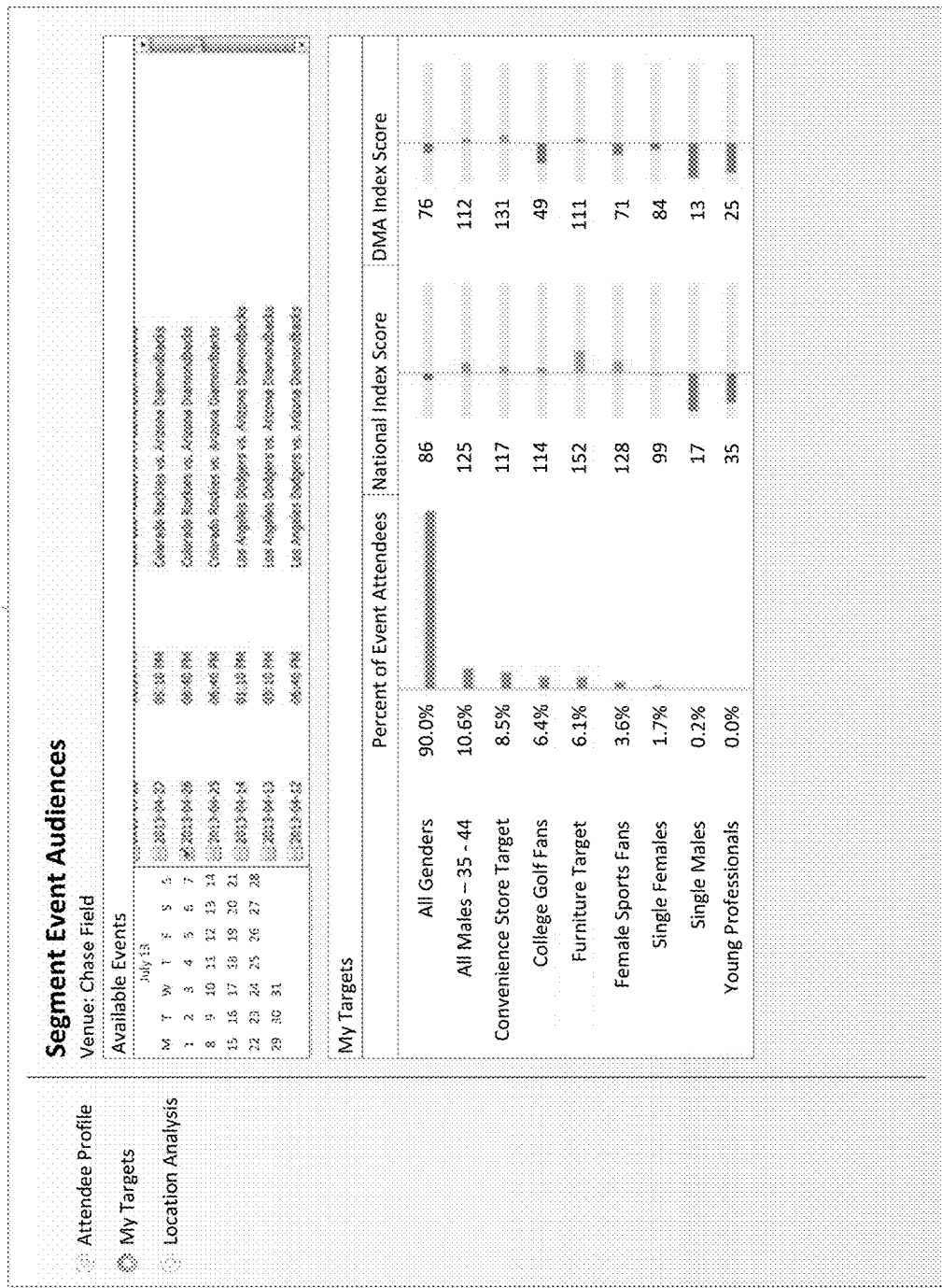
FIG. 4H illustrates an exemplary report of targeted profile information for a selected event at a venue.

FIG. 4H illustrates an exemplary report 168-H of targeted profile information for a selected event at a venue 200. Similar to the report 168-G, the report 168-H may include information about individuals in attendance at the selected baseball event. The report 168-H further includes information on user-defined targets of profile attributes 152 and subscriber attributes 144, including a comparison to a national average of those having the specified profile attributes 152, as well as to a more local average, such as those in a designated market region in which the venue 200 may be located. For example, based on the retrieved aggregate-level data 160 for attendees of the event, a user-defined target may provide a result indicating that 90% of attendees at the event have a reported gender. Other user-defined targets may provide a result indicating 10.6% of attendees at the event report as being male and 35-44, and that 1.7% of the attendees are reported as being single females.

Figure 4I:
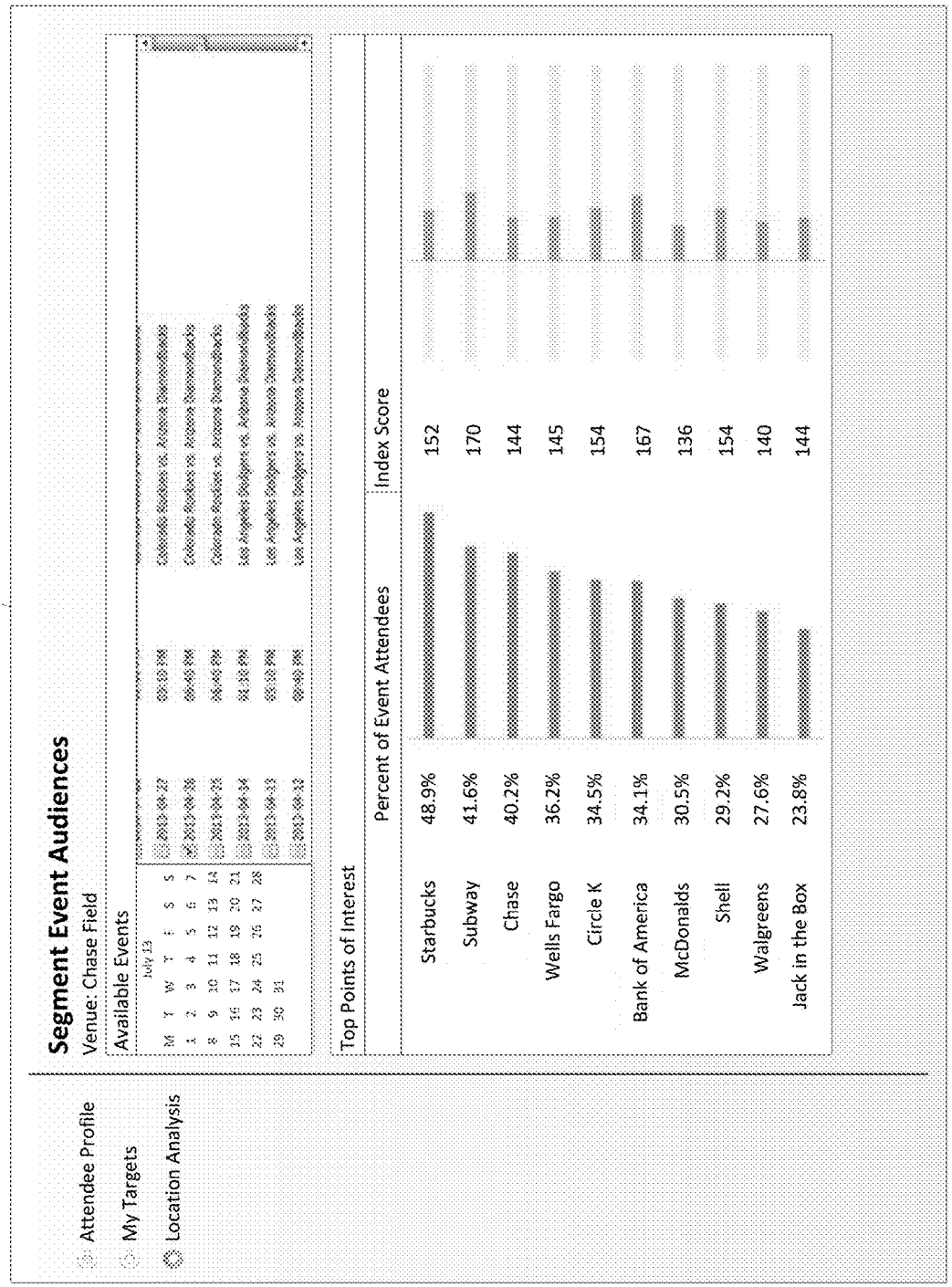
FIG. 4I illustrates an exemplary report of point of interest information for a selected event at a venue.

FIG. 4I illustrates an exemplary report 168-I of point of interest information for a selected event at a venue 200. Similar to the reports 168-G and 168-H, the report 168-I may also include information about individuals in attendance at the selected baseball event. Based on the selected event, the report 168-I may provide a listing of top points of interest frequented by attendees of the event. For example, 48.9% of the attendees are indicated in the exemplary received aggregate-level data 160 as having visited a Starbucks within, and 41.6% as having visited a Subway location. The listing of top points of interest may be listed for various time periods, such as: during the event, within an hour before and an hour after the event, the day of the event, within a number of days of the event, within the month including the event, as some non-limiting examples.

Figures 5, 6:
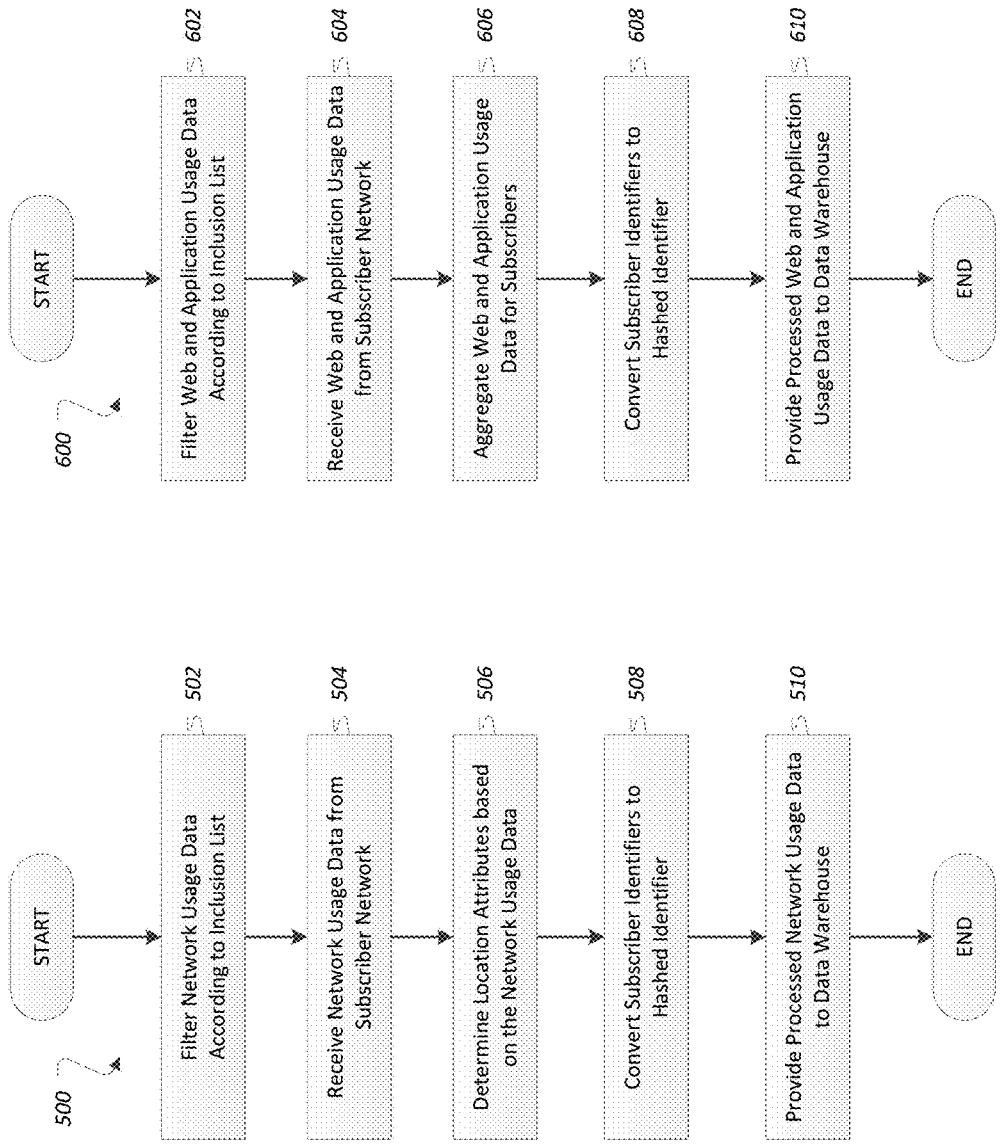
FIG. 5 illustrates an exemplary process for processing of network usage data for use in the generation of aggregate-level data.
FIG. 6 illustrates an exemplary process for processing of web and application usage data for use in the generation of aggregate-level data.

FIG. 5 illustrates an exemplary process 500 for processing of network usage data 106 for use in the generation of aggregate-level data 160. The process 500 may be performed, for example, by a location data source 110 of the system 100 in communication with a subscriber network 102 and a data warehouse 138.

At block 502, the subscriber network 102 filters captured network usage data 106 filtered according to an inclusion list 118. A copy of the inclusion list 118 may be received from the data warehouse 138 by the subscriber network 102, and may include information regarding which subscribers should be included or excluded from use of the system 100. A data filtering module 116 may be configured to filter transactions out of the network usage data 106 for subscribers who have not provided their consent to have their data included pursuant to the inclusion list 118. The inclusion list 118 may also be used to filter out other categories of subscribers whose privacy should be protected, such as business account holders, federal/state/local government accounts, or pre-paid accounts, and locations for which data should not be collected or should be discarded (e.g., determined by the location source 110 according to the determined location attributes 114).

At block 504, the location data source 110 receives the filtered network usage data 106 from the subscriber network 102. For example, the network elements of the subscriber network 102 may include network switches 108 or other devices throughout the network 102 configured to track and record subscriber transactions, including data captured when a subscriber performs a voice call over the subscriber network 102, sends or receives a text message over the network 102, or otherwise makes use of a data or voice service of the network to communicate with other network subscribers. The network usage data 106 may also include information regarding devices of the subscriber network 102 servicing the transaction and when the communications took place. The network usage data 106 may be forwarded from the network switches 108 to the location data source 110 for processing. Notably, the subscriber network 102 is in a unique position to capture subscriber usage data over the subscriber network 102 to determine both subscriber location and subscriber preferences. An individual website, in comparison, may be able to collect some data from viewers of their website, but would not be able to access customer information about subscriber visits to other stores, routes, attributes or demographics of subscribers not provided to the website.

At block 506, the location source 110 determines location attributes 114 from the received transactions of the network usage data 106. For example, a location assignment module 112 of the location data source 110 may be configured to associate the received network usage data 106 with corresponding location attributes 114, such as latitude and longitude coordinates, roadway segments, geo-fence information related to the location of the underlying call or network 102 use, or associations of the transaction record with a point of interest, such as a store or other landmark at the indicated location.

At block 508, the location source 110 converts subscriber identifiers 104 in the received network usage data 106 into hashed identifiers 122. For example, a hashing module 120 of the location source 110 may be configured to convert subscriber identifiers 104 included in the network usage data 106 into hashed identifiers 122 allowing for secure transmission to data warehouse 138.

At block 510, the location source 110 provides the processed network usage data 106 to the data warehouse 138. The data warehouse 138 may receive the network usage data 106 for further processing into aggregate-level data 160. After block 510, the process 500 ends.

FIG. 6 illustrates an exemplary process 600 for processing of web and application usage data 124 for use in the generation of aggregate-level data 160. The process 600 may be performed, for example, by a mobile usage data source 128 of the system 100 in communication with a subscriber network 102 and a data warehouse 138.

At block 602, the subscriber network 102 filters the received web and application usage data 124 according to an inclusion list 118. A copy of the inclusion list 118 may be received from the data warehouse 138, and may include information regarding which subscribers should be included or excluded from use of the system 100. The subscriber network 102 may accordingly filter transactions out of the web and application usage data 124 for subscribers pursuant to the inclusion list 118.

At block 604, the mobile usage data source 128 receives the filtered web and application usage data 124 from the subscriber network 102. For example, distribution centers 126 may be configured to record web and application usage data 124 regarding usage of subscriber network 102 services by subscriber communications devices. The recorded web and application usage data 124 may include data such as visited URLs, and time spent browsing or using network applications. The web and application usage data 124 may be forwarded from one or more distribution centers 126 to the mobile usage data source 128 for processing.

At block 606, the mobile usage data source 128 aggregates the received web and application usage data 124 for the subscribers. For example, a data aggregation 140 of the mobile usage data source 128 may be configured to accumulate web and application usage data 124 for a subscriber (e.g., keyed to subscriber identifier 104 or hashed identifier 122) over a period of time (e.g., per day). The data aggregation module 140 may aggregate accumulated request records to the same URL or domain into a single usage record. The data aggregation module 130 may be further configured to exclude domains from aggregation that are included in a white list 132 of domains received from the data warehouse 138.

At block 608, the mobile usage data source 128 converts subscriber identifiers 104 in the received web and application usage data 124 into hashed identifiers 122. For example, a hashing module 120 of the mobile usage data source 128 may be configured to convert subscriber identifiers 104 included in the web and application usage data 124 into hashed identifiers 122 allowing for secure transmission to the data warehouse 138.

At block 610, the mobile usage data source 128 provides the processed web and application usage data 124 to the data warehouse 138. The data warehouse 138 may receive the web and application usage data 124 for further processing into aggregate-level data 160. After block 610, the process 600 ends.

Figure 7:
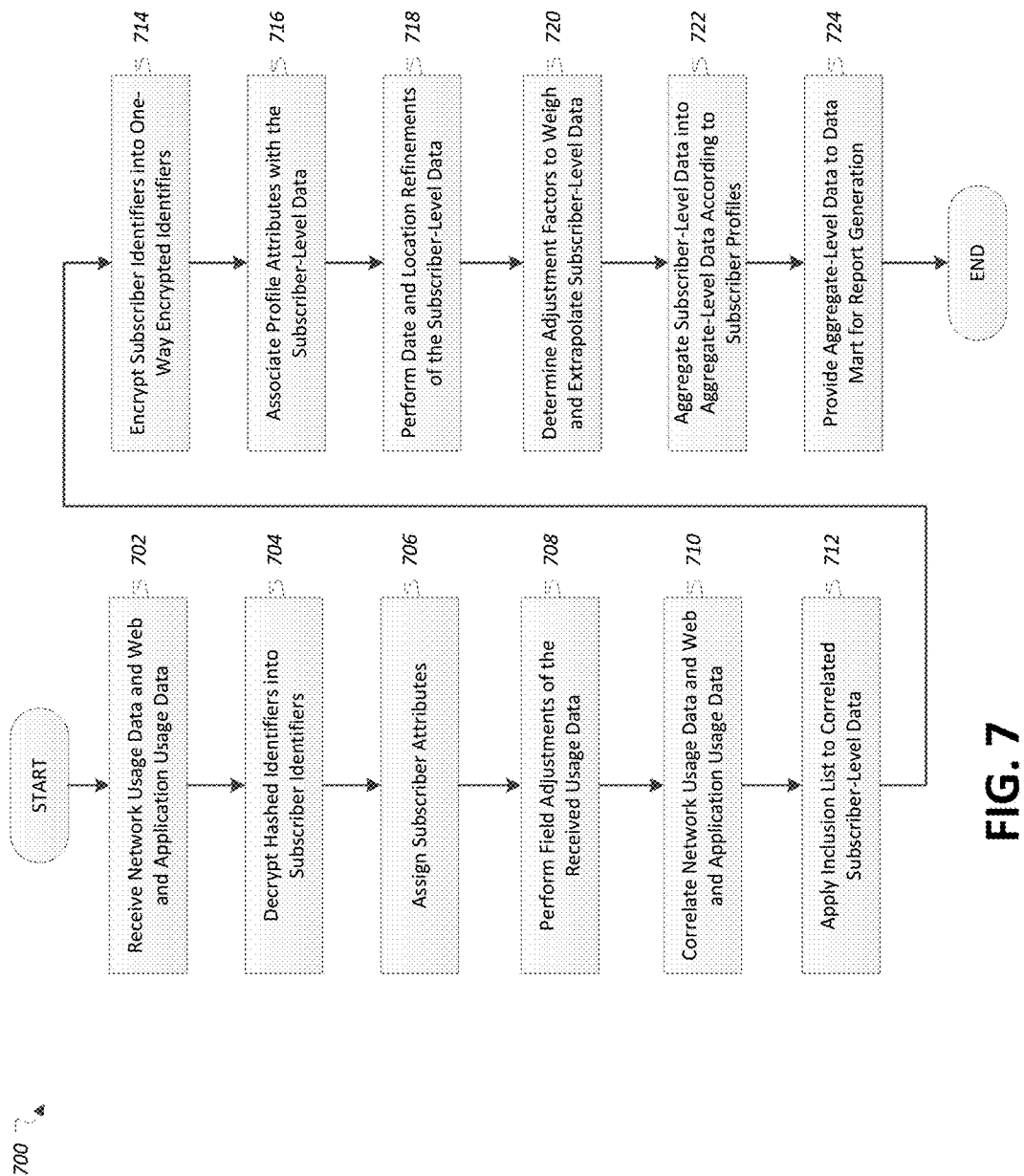
FIG. 7 illustrates an exemplary process for the generation of aggregate-level data 160.

FIG. 7 illustrates an exemplary process 700 for the generation of aggregate-level data 160. The process 700 may be performed, for example, by a data warehouse 138 of the system 100 in communication with a location source 110, a mobile usage data source 128, and one or more supplemental data sources 134.

At block 702, the data warehouse 138 receives network usage data 106 and web and application usage data 124. The network usage data 106 may be received, for example, from a location source 110, such as discussed above with respect to the process 500. The web and application usage data 124 may be received, for example, from a mobile usage data source 128, such as discussed above with respect to process 600.

At block 704, the data warehouse 138 decrypts hashed identifiers 122 into subscriber identifiers 104. For example, the data warehouse 138 may be configured to apply a network service provider defined two-way encryption/decryption methodology to decrypt hash identifiers 122 received by the data warehouse 138.

In block 706, the data warehouse 138 assigns subscriber attributes 144 to the received usage records. For example, a mobile usage analytics engine 142 of the data warehouse may be configured to assign categories to the URLs and network application use (e.g., "news", "sports", "real estate", "social", "travel", "business", "automotive", etc.), and to assign subscriber attributes 144 to the web and application usage data 124 records based on the category assignments. For instance, a subscriber who has browsed several websites within the "sports" category during the day might be associated with a "sports enthusiast" subscriber attribute 144. As another example, a subscriber who frequents travel websites may be associated with a "business travel" subscriber attribute 144. As yet a further example, a subscriber who frequents discount websites may be associated with a "discount shopper" subscriber attribute 144.

In block 708, the data warehouse 138 performs field adjustments of the received usage records. For example, the mobile usage analytics engine 142 may be configured to parse information in the web and application usage data 124 to create a separate data field for one or more of device operating system (e.g., Android, Apple iOS, webOS, Windows, etc.), web browser version and web browser type. As another example, the mobile usage analytics engine 142 may be configured to determine additional aggregated information in records relating to the subscribers, such as the total number of page views that the subscriber has browsed over time in the web and application usage data 124, or URLs visited before and after particular usage records.

In block 710, the data warehouse 138 correlates the received network usage data 106 with the received web and application usage data 124. For example, a data integration module 146 of the data warehouse 138 may be configured to correlate the network usage data 106 and web and application usage data 124 together based on subscriber identifiers 104 included in the usage data (e.g., device MDN), thereby providing combined information related to both subscriber location attributes 114 as well as related to subscriber attributes 144. This combined subscriber information may be referred to as subscriber-level data 148, and may be maintained by the date warehouse 138.

In block 712, the data warehouse 138 applies the inclusion list 118 to the subscriber-level data 148. For example, the data integration module 146 may be further configured to apply the inclusion list 118 against the subscriber-level data 148 to ensure that no records belonging to excluded subscribers are included in the subscriber-level data 148. In other examples, the data integration module 146 may be further configured to apply the inclusion list 118 against the network usage data 106 and web and application usage data 124 before the correlation is performed in block 710.

In block 714, the data warehouse 138 encrypts the subscriber identifiers 104 in the subscriber-level data 148 into one-way encrypted identifiers 150. For example, the data integration module 146 may utilize a one-way mechanism suitable for providing identifiers in a form that is relatively impervious to decryption due to its one-way nature (e.g., for use by the data mart 166 and portal devices 170). To do so, the data integration module 146 may perform a hashing of the subscriber identifiers 104 and a salt value using a cryptographic hashing function and a truncation of the digest value to produce a one-way encrypted identifier 150 that does not contain the entire encrypted value, thereby making it extremely difficult for a one-way encrypted identifier 150 to be reversed back into the original subscriber identifier 104.

In block 716, the data warehouse 138 associates profile attributes 152 with the subscriber-level data 148. For example, the data integration module 146 may be configured to identify and associate profile attributes 152 with subscribers of the subscriber-level data 148. The profile attributes 152 may identify various profile characteristics of the subscribers, such as age range, income level, gender, education level, race/ethnicity, primary language for communication, zip code of residence, and whether the subscriber owns or rents a home.

In block 718, the data warehouse 138 performs data and location refinements of the subscriber-level data 148. As one example, the data integration module 146 may be configured to associate the subscriber-level data 148 records with day-parts (e.g., rounded to 1-hour periods) based on timestamp information included in the network usage data 106 and web and application usage data 124 being combined. As another example, the data integration module 146 may be configured to assign points of interest to records of subscriber-level data 148, based on identification of a close point of interest to the location information of the transaction specified by the corresponding record.

In block 720, the data warehouse 138 determines adjustment factors 156 to apply to the subscriber-level data 148 to weigh and extrapolate the subscriber-level data 148 to be representative of the population at large. For example, an analytics engine 154 of the data warehouse 138 may be configured to assign subscriber weight adjustment factors 156 to subscribers to account for differences in composition of the pool of subscribers of the network service provider as compared to the population in general. As another example, the analytics engine 154 may be configured to assign national weight adjustment factors 156 to subscribers to account for differences in in size and distribution of the pool of subscribers of the network service provider as compared to the population in general. As yet a further example, the analytics engine 154 may be configured to assign usage adjustment factors 156 to adjust for relative usage levels of different subscribers, as some individuals use their phones more frequently than others. As yet another example, the analytics engine 154 may be configured to assign non-usage adjustment factors 156 to account for individuals who were at a location (e.g., at a sporting event), but who were inactive on their devices. As another type of adjustment factor 156, the analytics engine 154 may be configured to assign confidence adjustment factors 156 to determined points of interest for subscribers based on relative proximity of the location attributes 114 of the underlying transactions to the identified point of interest locations.

In block 722, the data warehouse 138 aggregates the subscriber-level data 148 into aggregate-level data 160. For example, the profile aggregator 158 may match the records of subscriber-level data 148 to a set of subscriber profiles 162 that match the attributes values of the subscribers (e.g., subscriber attributes 144 and profile attributes 152). The profile aggregator 158 may further use the determined adjustment factors 156 associated with the subscribers to weigh the subscriber transactions being aggregated to determine total extrapolated counts for individuals matching the respective subscriber profiles 162. In some cases, the profile aggregator 158 may utilize a subscriber to profile mapping 164 that associates subscriber with subscriber profiles 162 and adjustment factors 156 to aggregate subscriber records matching the corresponding profiles 162.

In block 724, the data warehouse provides the aggregate-level data 160 to the data mart 166. The aggregate-level data 160 may accordingly facilitate the providing of updated reports 168 by the data mart 166 to requesting portal devices 170. As the data mart 166 may store the aggregate-level data 160, but not have access to the subscriber-level data 148, privacy of the subscribers may be safe from those having access to the report 168 generation or other aspects of the data storage of the data mart 166. After block 724, the process 700 ends.

Figure 8:
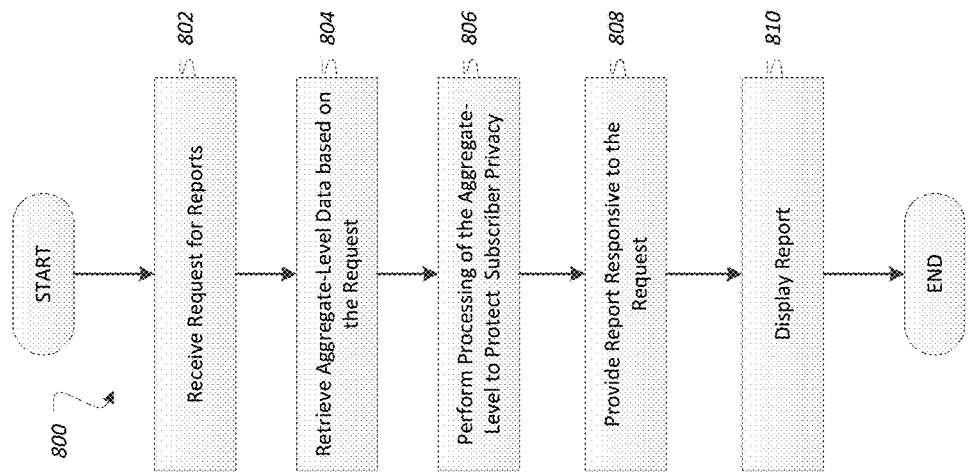
FIG. 8 illustrates an exemplary process for the generation of reports from aggregate-level data.

FIG. 8 illustrates an exemplary process 800 for the generation of reports 168 from aggregate-level data 160. The process 800 may be performed, for example, by a data mart 166 of the system 100 in communication with a data warehouse 138 and one or more portal devices 170.

At block 802, the data mart 166 receives a request 172 for a report 168 from a portal device 170. As some example, a user of a portal device 170 may provide the request 172 for a report 168 similar to one or more of the reports 168-A through 168-I discussed in detail above. The request 172 may include criteria for the report 168, such as one or more location attributes 114 and profile attributes 152.

At block 804, the data mart 166 retrieves aggregate-level data 160 based on the received request 172. For example, the data mart 166 may query the aggregate-level data 160 for subscriber profiles 162 matching the location attributes 114 and profile attributes 152 included in the request 172.

At block 806, the data mart 166 performs processing of the aggregate-level data 160 to protect subscriber privacy. For example, the data mart 166 may utilize a data presentation module 174 to perform rounding of small percentage hard values less than a threshold value. As one example, the data presentation module 174 may be configured to perform upward rounding of small percentage numbers greater than zero but less than the threshold value (e.g., one hundred and fifty), in order to prevent the figures as being displayed as substantially too low due to rounding of small percentage values. As another example, the data presentation module 174 may be configured to perform downward rounding to zero of data values that are less up to a threshold value (e.g., one hundred and fifty), and inflation of exceeding the threshold value to redistribute the remaining percentage across the remaining attribute values to add up to 100%. Minimum threshold rounding may be beneficial to preserve the privacy of subscribers by preventing a user from selecting search criteria narrow enough to allow for the querying of data known to be generated by only one or a few individuals.

At block 808, the data mart 166 provides the report 168 to the portal device 170, responsive to the request 172. At block 810, the portal device 170 displays the received report 168. After block 810, the process 800 ends.

Thus, by collating information such as network usage data 106, web and application usage data 124, and supplemental information 136 according to subscriber attributes 144 and profile attributes 152, a data warehouse 138 may be configured to generate aggregate-level data 160 indicative of multiple aspects of the behavior and characteristics of network subscribers. By facilitating the generation of reports 168 from the aggregate-level data 160, the system 100 may be able to provide detailed insights into the subscribers that may useful for marketing purposes. For instance, the reports 168 may allow venues 200 or advertiser using advertisement locations 302 to review statistics of the demographics of users that may pass by advertisement locations 302 or that may be present at an event at a venue 200.

In general, computing systems and/or devices, such as the location data source 110, mobile usage data source 128, data warehouse 138, data mart 166, and portal device 170, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the location data source 110, mobile usage data source 128, data warehouse 138, data mart 166, and portal device 170, generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data warehouse 138 and data mart 166, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. In some example, the computer program product may be provided as software that when executed by one or more processors provides the operations described herein. Alternatively, the computer program product may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a server in communication with at least one data source device having network usage data and web and application usage data of a subscriber network, the server performing operations including:
correlating network usage data and web and application usage data to generate subscriber-level data;
associating, with the subscriber-level data, subscriber attributes indicative of a preference of a subscriber for content in a particular category of content, and profile attributes indicative of demographic characteristics of the subscriber;
matching the subscriber-level data with a set of subscriber profiles, each of the set of subscriber profiles including a set of subscriber attributes and profile attributes associated with the respective subscriber profile; and
applying an adjustment factor to the subscriber-level data in response to aggregating the subscriber-level data into aggregate-level data according to the matching subscriber profiles.

2. The system of claim 1, wherein the adjustment factor includes:
a usage adjustment factor adjusting for relative usage levels of different subscribers of the subscriber network, and
a non-usage adjustment factor accounting for individuals not performing device usage.

3. The system of claim 1, the operations further including:
receiving a request for a report from a portal device, the request associated with criteria including a subscriber attribute and a profile attribute; and
providing the aggregate-level data in a report to the portal device in response to the request.

4. The system of claim 1, the operations further including:
determining the adjustment factor to apply to the subscriber-level data to weigh and extrapolate the subscriber-level data to be representative of the population at large; and
performing a weighted aggregation of the subscriber-level data according to the determined adjustment factor.

5. The system of claim 1, wherein the adjustment factor includes at least two of: (i) a subscriber weight adjustment factor accounting for differences in composition of a pool of subscribers of the network service provider as compared to the population in general; (ii) a national weight adjustment factor accounting for differences in in size and distribution of the pool of subscribers of the network service provider as compared to the population in general; (iii) a usage adjustment factor adjusting for relative usage levels of different subscribers of the network service provider, and (iv) a non-usage adjustment factor accounting for individuals at a location not performing device usage.

6. The system of claim 3, the operations further including:
preventing the providing of aggregate-level data in a report according to a predefined aggregation threshold.

7. The system of claim 1, the operations further including:
matching the subscriber-level data to the set of subscriber profiles using a profile mapping, the profile mapping including an association of subscriber identifiers with subscriber profiles; and using the adjustment factor associated with the subscribers in the profile mapping to weigh subscriber transactions being aggregated to determine extrapolated counts for subscribers matching the subscriber profiles.

8. The system of claim 1, the operations further including:
filtering the network usage data and the web and application usage data according to an inclusion list to remove usage data associated with ineligible subscribers.

9. A method comprising:
receiving network usage data indicative network usage and web and application usage data of a subscriber network;
correlating the network usage data and web and application usage data to generate subscriber-level data;
associating, with the subscriber-level data, subscriber attributes indicative of a preference of a subscriber for content in a particular category of content, and profile attributes indicative of demographic characteristics of the subscriber;
matching the subscriber-level data with a set of subscriber profiles, each of the set of subscriber profiles including a set of subscriber attributes and profile attributes associated with the respective subscriber profile; and
applying an adjustment factor to the subscriber-level data in response to aggregating the subscriber-level data into aggregate-level data according to the matching subscriber profiles.

10. The method of claim 9, further comprising:
receiving a request for a report from a portal device, the request associated with criteria including a subscriber attribute and a profile attribute; and
providing the aggregate-level data in a report to the portal device in response to the request.

11. The method of claim 9, further comprising:
determining the adjustment factor to apply to the subscriber-level data to weigh and extrapolate the subscriber-level data to be representative of the population at large; and
performing a weighted aggregation of the subscriber-level data according to the determined adjustment factor.

12. The method of claim 9, further comprising:
preventing publishing of aggregate-level data for a profile according to a predefined aggregation threshold.

13. The method of claim 9, further comprising:
matching the subscriber-level data to the set of subscriber profiles using a profile mapping, the profile mapping including an association of subscriber identifiers with subscriber profiles; and
using the adjustment factor associated with the subscribers in the profile mapping to weigh subscriber transactions being aggregated to determine extrapolated counts for subscribers matching the subscriber profiles.

14. The system of claim 9, further comprising:
filtering the network usage data and the web and application usage data according to an inclusion list to remove usage data associated with ineligible subscribers.

15. A non-transitory computer readable medium storing computer-executable instructions executable by a computing device to provide operations comprising:
receiving network usage data and web and application usage data of a subscriber network;
correlating the network usage data and web and application usage data to generate subscriber-level data;
associating, with the subscriber-level data, subscriber attributes indicative of a preference of the subscriber for content in a particular category of content, and profile attributes indicative of demographic characteristics of the subscriber;
matching the subscriber-level data with a set of subscriber profiles, each of the set of subscriber profiles including a set of subscriber attributes and profile attributes associated with the respective subscriber profile; and
applying an adjustment factor to the subscriber-level data in response to aggregating the subscriber-level data into aggregate-level data according to the matching subscriber profiles.

16. The non-transitory computer readable medium of claim 15, the operations further comprising:
receiving a request for a report from a portal device, the request associated with criteria including a subscriber attribute and a profile attribute; and
providing the aggregate-level data in a report to the portal device in response to the request.

17. The non-transitory computer readable medium of claim 15, the operations further comprising:
determining the adjustment factor to apply to the subscriber-level data to weigh and extrapolate the subscriber-level data to be representative of the population at large; and
performing a weighted aggregation of the subscriber-level data according to the determined adjustment factor.

18. The non-transitory computer readable medium of claim 15, the operations further comprising:
preventing publishing of aggregate-level data for a profile according to a predefined aggregation threshold.

19. The non-transitory computer readable medium of claim 15, the operations further comprising:
matching the subscriber-level data to the set of subscriber profiles using a profile mapping, the profile mapping including an association of subscriber identifiers with subscriber profiles; and
using the adjustment factor associated with the subscribers in the profile mapping to weigh subscriber transactions being aggregated to determine extrapolated counts for subscribers matching the subscriber profiles.

20. The non-transitory computer readable medium of claim 15, the operations further comprising:
filtering the network usage data and the web and application usage data according to an inclusion list to remove usage data associated with ineligible subscribers.

* * * * *